(12) United States Patent
Stark et al.

(10) Patent No.: US 9,381,459 B2
(45) Date of Patent: Jul. 5, 2016

(54) MIST ELIMINATION AND POLLUTANT REMOVAL DEVICE AND METHOD

(71) Applicant: W. L. Gore & Associates, Inc., Newark, DE (US)

(72) Inventors: Stephen K. Stark, Wilmington, DE (US); Wai Sing Poon, Hockessin, DE (US); Richard E. Gebert, Elkton, MD (US); Jeffrey Alan Kolde, Avondale, PA (US)

(73) Assignee: W. L. Gore & Associates, Inc., Newark, DE (US)

( * ) Notice: Subject to any disclaimer, the term of this patent is extended or adjusted under 35 U.S.C. 154(b) by 0 days.

(21) Appl. No.: 14/188,924

(22) Filed: Feb. 25, 2014

(65) Prior Publication Data

US 2014/0260976 A1    Sep. 18, 2014

Related U.S. Application Data

(60) Provisional application No. 61/798,033, filed on Mar. 15, 2013.

(51) Int. Cl.
*B01D 53/02* (2006.01)
*B01D 53/04* (2006.01)
*B01D 47/14* (2006.01)

(52) U.S. Cl.
CPC ............ *B01D 53/0407* (2013.01); *B01D 47/14* (2013.01); *B01D 53/0446* (2013.01);
(Continued)

(58) Field of Classification Search
CPC ..................... B01D 2253/202; B01D 2253/25; B01D 2257/302; B01D 2257/602; B01D 2258/0283; B01D 47/14; B01D 53/0407
See application file for complete search history.

(56) References Cited

U.S. PATENT DOCUMENTS

| 4,175,938 A | 11/1979 | Regehr et al. |
| 4,601,731 A | 7/1986 | Michelson |

(Continued)

FOREIGN PATENT DOCUMENTS

| JP | 11-057360 A | 3/1999 |
| KR | 20-2009-0000472 | 1/2009 |
| WO | WO2006/096180 | 9/2006 |

OTHER PUBLICATIONS

Monat, J.P., K.J. McNulty, I.S. Michelson, OX Hansen, "Accurate Evaluation of Chevron Mist Eliminators," Chemical Engineering Progress, Dec. 1986, pp, 32-39.
(Continued)

*Primary Examiner* — Christopher P Jones
(74) *Attorney, Agent, or Firm* — Kilpatrick Townsend & Stockton, LLP

(57) ABSTRACT

An integrated device for removal of both liquid-containing droplets and pollutants from a gas stream includes a plurality of passageways and a plurality of exposed surface portions, different ones of the surface portions disposed along different ones of the plurality of passageways. The plurality of passageways include an inlet and an outlet for the flow of a gas stream therethrough, wherein each passageway includes at least one segment configured to perturb the flow of at least a portion of the gas stream between the inlet and the outlet. Such gas perturbation enhances gas stream contact with the exposed surfaces. Portions of the exposed surfaces comprise a sorbent-polymer-composite material adapted for adsorption of elemental and oxidized mercury vapor. The exposed surfaces are disposed to enhance the removal of liquid-containing droplets and elemental and oxidized mercury vapor.

30 Claims, 17 Drawing Sheets

(52) U.S. Cl.
CPC ....... *B01D2247/04* (2013.01); *B01D 2247/106* (2013.01); *B01D 2253/202* (2013.01); *B01D 2253/25* (2013.01); *B01D 2257/302* (2013.01); *B01D 2257/602* (2013.01); *B01D 2258/0283* (2013.01)

(56) References Cited

U.S. PATENT DOCUMENTS

| | | | |
|---|---|---|---|
| 5,230,725 | A | 7/1993 | Chowaniec |
| 5,891,402 | A | 4/1999 | Sassa et al. |
| 6,695,894 | B2 | 2/2004 | Chang et al. |
| 6,905,534 | B2 | 6/2005 | Chang et al. |
| 7,708,803 | B2 | 5/2010 | Berry et al. |
| 8,241,398 | B2 | 8/2012 | Berry et al. |
| 2007/0207923 | A1 | 9/2007 | Lu et al. |
| 2008/0105121 | A1 | 5/2008 | Chang |

OTHER PUBLICATIONS

Kolde, J. et al "The core mercury control system", W, L, Gore & Associates, Inc. 2012, pp. 1-4.

PCT/US2014/018495 International Search Report dated Jun. 20, 2014.

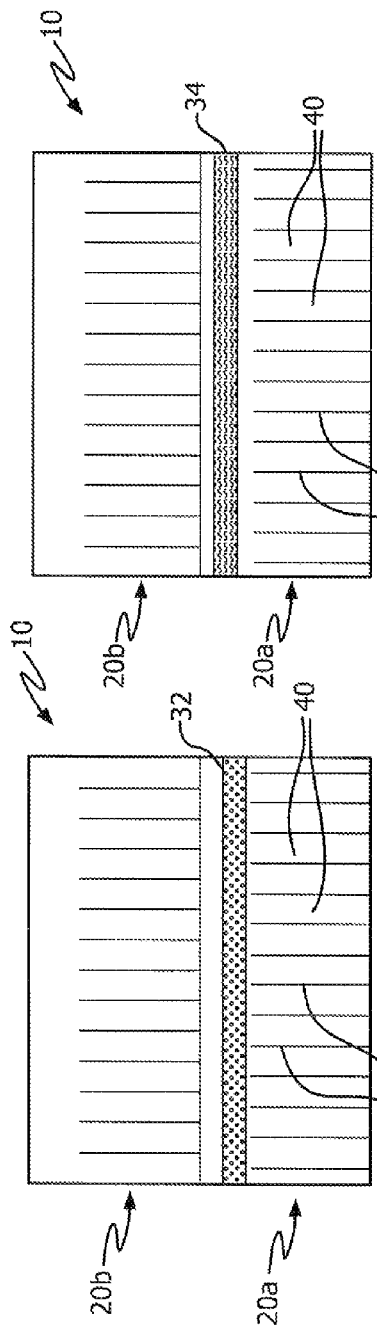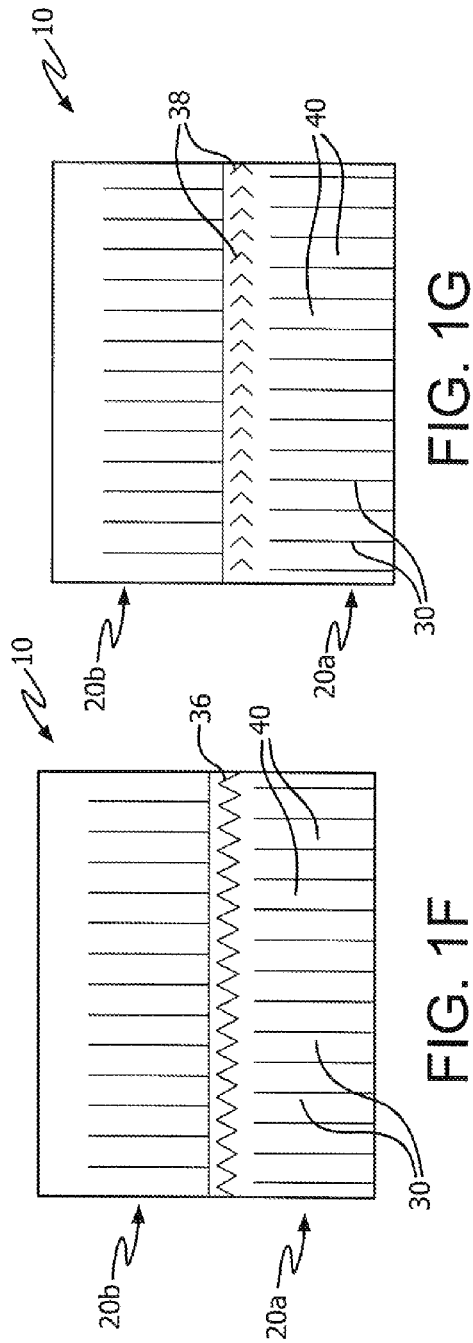

MIST ELIMINATION AND POLLUTANT REMOVAL DEVICE AND METHOD

FIELD OF THE INVENTION

The present invention relates to devices employed for the treatment of gas streams to remove undesired constituents thereof, and more particularly, to integrated devices and related implementation methods for removing both liquid-containing droplets (e.g., mist elimination) and pollutants (e.g., filtered elemental and oxidized mercury vapor) from a gas stream in a wet scrubber. The integrated devices and related methods are particularly apt for use in wet scrubbers employed to remove undesired constituents present in exhaust gas streams of power generation plants (e.g., coal-fired power generation plants).

BACKGROUND OF THE INVENTION

Filters are used in a wide variety of applications where it is desired to separate particles or other substances from a fluid stream (e.g., a stream of gas). Applications of filters include removing substances from flue gases such as those from coal and oil fired power generation plants. Such flue gases may contain substantial varieties and quantities of environmental pollutants, such as sulfur oxides ($SO_2$ and $SO_3$), nitrogen oxides (NO and $NO_2$), mercury (Hg) vapor, and particulate matters (PM). In the United States, burning coal alone generates about 27 million tons of $SO_2$ and 45 tons of Hg each year.

The destructive effects of various pollutants on human health and on the ecosystem have long been recognized. For example, SOx and NOx have been linked to the outbreak of respiratory diseases in affected areas. They may also form acid rain, which damages forests, fisheries, and architectures. As for Hg, it is a potent toxin to the nervous system. Exposure to mercury can affect the brain, spinal cord, and other vital organs.

Environmental regulations require significant reductions in mercury emissions. These regulations extend to different industries; presenting challenges in various types of facilities (e.g., coal-fired power generation plants).

SUMMARY OF THE INVENTION

Integrated device embodiments described herein provide for both the removal of both liquid-containing droplets (e.g., via mist elimination) and for the removal of pollutants (e.g., via filtration) from a gas stream. As may be appreciated, the dual functionality provided by such integrated device embodiments yields space-saving advantages, thereby facilitating the implementation of improved technologies for removal of pollutants (e.g., mercury components of exhaust gas streams), including in particular wet scrubber implementations. In conjunction with providing such dual functionality, integrated device embodiments described herein also advantageously provide for minimal pressure drop there across, thereby further rendering the embodiments apt for various applications.

In one embodiment, an integrated device may be provided that includes a plurality of passageways each having an inlet and an outlet for the flow of a gas stream therethrough, wherein each passageway of the plurality of passageways includes at least one segment configured to perturb the flow of at least a portion of a gas stream between the inlet and the outlet thereof. The perturbation of gas stream flow provides for gas stream contact with passageway surfaces at increased angles of incidence, thereby enhancing the pollutant and liquid-containing droplet removal capabilities of the integrated device.

In that regard, the integrated device embodiment may further include a plurality of exposed surface portions, different ones of which are disposed along different ones of the plurality of passageways. By way of example, at least some of such exposed surface portions may be disposed at and/or downstream of the segments that are configured to perturb gas flow. In one approach, each of the plurality of exposed surface portions may include a material adapted for adsorption of elemental and/or oxidized mercury vapor present in a gas stream (e.g., a sorbent-polymer-composite (SPC)). In some applications, an SPC material may also be provided for contact conversion of sulfuric oxides to sulfuric acid.

In contemplated embodiments, the gas perturbation segment(s) of each of the passageways may include at least one passageway surface discontinuity. In one approach, a surfaceway discontinuity may comprise an open space between different surface portions along one or a plurality of the passageways. Alternatively or additionally, a surface discontinuity may comprise a plurality of different surface portions disposed in non-aligned relation relative to one another along one or more of the passageways. For example, different surface portions of a passageway may be angled relative to one another in one or more dimensions (e.g., to define tortious passageways).

In some embodiments, an integrated device may be provided that comprises a plurality of modules defining the plurality of passageways and the plurality of exposed surface portions. In particular, at least two modules of the plurality of modules may be positionable in adjacent relation in a gas stream for series gas stream flow therethrough, wherein the two modules define different parts of each of a first plurality of the plurality of passageways.

In some implementations, at least two modules may be positionable in adjacent relation so that different parts of each of the first plurality of passageways have an open space therebetween. Alternatively or additionally, the two modules may be positionable in adjacent relation so that different surface portions corresponding with different parts of the first plurality of passageways are disposed in non-aligned relation to one another. For example, at least two modules may be positionable in adjacent relation so that different surface portions corresponding with different parts of each of the first plurality of passageways are disposed at an angle relative to one another in one or more dimensions (e.g., to define tortious passageways).

In various embodiments, each of the plurality of modules may comprise alternating layers of pleated and flat sheets, wherein the pleated and/or flat sheets may comprise surface portions comprising a material adapted for adsorption of elemental and oxidized mercury vapor, e.g., comprising an SPC material. Further, in some embodiments, the pleated sheets and/or flat sheets may each comprise a middle layer (e.g., comprising polyvinylidene fluoride (PVDF)), laminated between outer tape layers comprising an SPC material. In that regard, the middle layer may be provided to enhance the ability of the pleated sheets and/or flat sheets to maintain their shape during handling and use at elevated temperatures in a corrosive environment. Further, the pleated sheets and/or flat sheets may be substantially gas impermeable (e.g., wherein gas stream flow is restricted to flow along and between the surfaces of the sheets).

In some implementations, enhanced shape-holding characteristics of the pleated and flat sheets may be provided by lamination of a melt-processable resin layer between two layers of SPC tape. In turn, a thicker construction may be realized. The thicker construction and middle resin layer provide sufficient stiffness to maintain open passageways for gas flow during use. Polyvinylidene fluoride (PVDF) is a melt-processable fluoropolymer resin which provides the necessary stiffness as well as the chemical and thermal resistance properties desired for wet scrubber conditions.

By way of example, the pleated and/or flat sheet layers may each comprise a three layer laminate (e.g., two outer layers comprising an SPC material and a middle layer comprising PVDF) that may have a bending resistance stiffness at least three times greater than that of each of the outer tape layers as measured with a Gurley Stiffness Tester (Model 4171). In that regard, the three layer laminate of the pleated and/or flat sheets may have a bending resistance stiffness of at least 1000 mg as measured with a Gurley Stiffness Tester (Model 4171).

In another measure, the pleated sheets and/or flat sheets may each be provided so as to maintain their respective shapes at temperatures up to 80° C. (e.g., as may be experienced in wet scrubber applications). In various implementations, the flat sheets and/or pleated sheets may include outer tape layers comprising an SPC material, and a middle layer (e.g., comprising polyvinylidene fluoride (PVDF)) in the form of an extruded screen or film, wherein the three layers are laminated together.

In some embodiments, the pleated sheets may be shaped with undulations (e.g., U-shaped and/or V-shaped pleats) to maintain spacing between the flat sheets and thereby define configurations of the passageways. In some implementations, at least a portion of one of said plurality of pleated sheets and said plurality of flat sheets comprises sheets having top edges angled for drainage of liquid-containing droplets formed thereupon.

In one approach, each of the plurality of modules may be assembled by arranging alternating layers of pleated and flat sheets within a corresponding one of a corresponding plurality of support frames, wherein each of the support frames may have at least two opposing ends that are at least partially open for passage of gas stream therethrough. In some implementations, a plurality of support frames may be utilized that are of a right rectangular prism configuration and/or an oblique rectangular prism configuration.

In that regard, a right rectangular prism configuration frame may be utilized to supportably contain alternating layers of pleated and flat sheets so that the layers of the flat sheets and the layers of the pleats of the pleated sheets are oriented substantially perpendicular to parallel planes defined by opposing open ends of the frame, with pleats of the pleated sheets oriented substantially parallel to a center axis of the frame that extends through the opposing open ends. Alternatively and/or additionally, an oblique rectangular prism configuration frame may be utilized to supportably contain alternating layers of pleated and flat sheets so that the flat sheets and the pleated sheets are oriented at an angle (i.e., non-perpendicular) to parallel planes defined by opposing, open ends of the frame, with the pleats of the pleated sheets oriented substantially parallel to a center axis of the frame that extends through the opposing open ends.

In some implementations, at least some of the plurality of frames may be provided with stacking members that extend from a top surface thereof, wherein the stacking members may function to restrain lateral movement of another frame stacked directly thereupon. In that regard, in one embodiment, a plurality of frames may be provided having substantially identical top end and bottom end shapes to facilitate stacking, wherein a plurality of stacking members are disposed about the periphery of top surfaces of the frames.

In various embodiments, exposed surface portions may include an SPC material in which the polymer material includes a fluoropolymer. More particularly, the fluoropolymer material may comprise a fluoropolymer selected from a group comprising of polytetrafluoroethylene (PTFE), polyfluoroethylene propylene (PFEP); polyperfluoroacrylate (PPFA); polyvinylidene fluoride (PVDF): a terpolymer of tetrafluoroethylene, hexafluoropropylene and vinylidene fluoride (THV); polychloro trifluoro ethylene (PCTFE), and other copolymers or terpolymers containing at least one fluoromonomer with or without additional non-fluorinated monomers. Further, the SPC material may comprise a sorbent material that has been treated with at least one chemical substance selected from a group comprising: alkaline metal iodides, organic iodide compounds, vanadium oxides, metal sulfates, elemental sulfur, sulfuric acid, oxides of iodine, chlorides of potassium, bromides of potassium, chlorides of sodium, bromides of sodium, chlorides of ammonium, bromides of ammonium, iodides of ammonium, zinc acetate and iodide coordination complexes.

As may be appreciated, integrated device embodiments described herein may be employed in various methods for removing both liquid-containing droplets and pollutants from a gas stream. In some method embodiments, an integrated device embodiment may be positioned for contact in a gas stream, wherein the method includes contacting the gas stream with exposed surface portions of the integrated device, wherein liquid-containing droplets present in the gas stream contact and thereby are removed from the gas stream at the plurality of exposed surface portions, and wherein elemental and oxidized mercury vapor present in the gas stream are adsorbed by and affixed within an SPC material of the exposed surface portions. In turn, the method embodiment may include the step of collecting liquid-containing droplets from the plurality of exposed surface portions. Further, in some embodiments the SPC material may provide for contact conversion of sulfuric oxides present in the gas stream to sulfuric acid droplets, wherein the sulfuric acid droplets may be collected with the liquid-containing droplets.

In contemplated implementations, a method embodiment may include locating the integrated device embodiment in a wet scrubber. In various configurations, the integrated device embodiment may be located within an enclosed housing of a wet scrubber (e.g., a wet scrubber utilized for treatment of an exhaust gas stream of a coal-fired power generation plant). By way of example, the integrated device embodiment may be located above between a liquid spray assembly and a gas stream outlet of a wet scrubber.

In retrofit applications, method embodiments may further provide for the removal of a mist eliminator from a region within a wet scrubber. In such implementations, the method may provide for positioning of an integrated device embodiment in at least a portion of the region of the wet scrubber from which the mist eliminator was removed. In some applications, one or more support members utilized to support a removed mist eliminator may be readily employed to support the integrated device embodiment. In one approach, a plurality of modules may be sized for supportable positioning on the support member(s), wherein one or a plurality of multiple module stacks may be supported. In some implementations, the integrated device embodiment may provide for sulfur oxide removal from a gas stream, wherein resultant sulfuric acid droplets may drop off of the integrated device embodiment and contact underlying componentry of a wet scrubber to thereby remove undesired solids and fouling materials therefrom.

Numerous additional features and advantages of the present invention will become apparent to those skilled in the art upon consideration of the embodiment descriptions provided hereinbelow.

BRIEF DESCRIPTION OF THE DRAWINGS

FIG. 1D is a schematic side view of an integrated device embodiment and an optional included layer.

FIG. 1E is a schematic side view of an integrated device embodiment and another optional included layer.

FIG. 1F is a schematic side view of an integrated device embodiment and a further optional included layer.

FIG. 1G is a schematic side view of an integrated device embodiment and an optional plurality of vanes.

DETAILED DESCRIPTION

Various embodiments of an improved integrated device for removal of both liquid-containing droplets and pollutants from a gas stream will now be described. Further, embodiments of implementations of the integrated device embodiments will be described. Additional integrated device embodiments and implementations thereof will become apparent upon consideration of the descriptions that follow and are intended to be within the scope of the present invention.

Figure 1A:
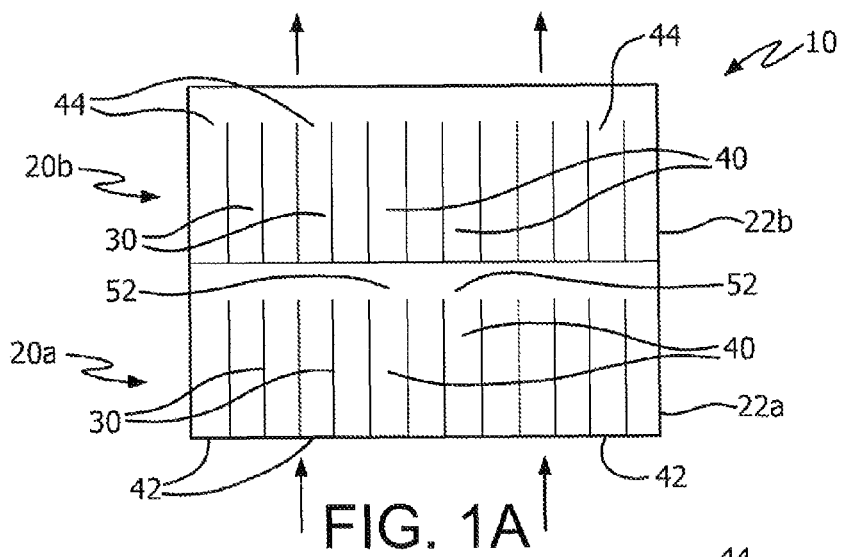
FIG. 1A is a schematic side view of an integrated device embodiment.
Figure 1B:
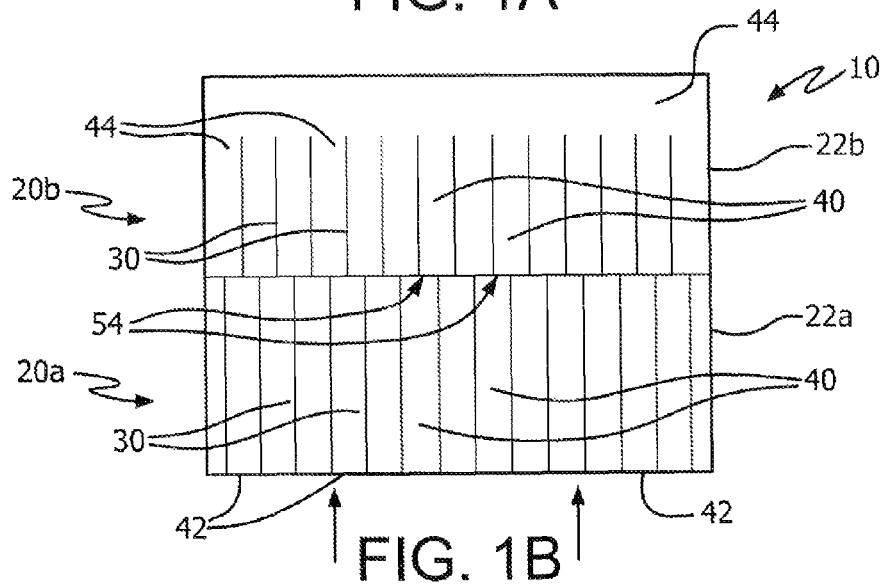
FIG. 1B is a schematic side view of another integrated device embodiment.
Figure 1C:
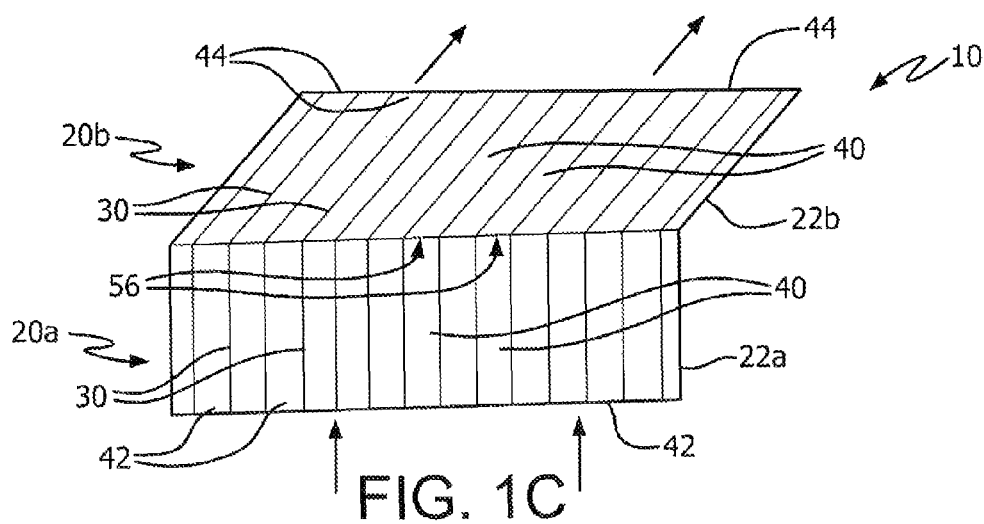
FIG. 1C is a schematic side view of an additional integrated device embodiment.

FIGS. 1A, 1B, and 1C schematically illustrate different integrated device embodiments that may comprise two modules disposed in adjacent relation for series gas flow therethrough (e.g., upward flow). As will be described, each of the embodiments shown in FIGS. 1A, 1B, and 1C provide different approaches for the provision of a plurality of passageways, each having an inlet and an outlet for the flow of a gas stream therethrough, with at least some of the passageways having at least one segment configured to perturb the flow of at least a portion of a gas stream between the inlet and the outlet thereof.

In FIGS. 1A, 1B, and 1C an integrated device 10 may include a first module 20a and a second module 20b, the first and second modules 20a, 20b each comprising panels 30 supported by frame members 22a, 22b, respectively. In that regard, at least the bottom and sides of the frame members 22a, 22b may be provided to support, or contain, the panels 30. Further, at least the bottom and top of frame members 22a, 22b may be at least partially open to allow for gas stream passage therethrough. The first and second modules 20a, 20b may be provided for separate handling and positioning via corresponding frame members 22a, 22b. As illustrated, panels 30 of the first and second modules 20a, 20b may define a plurality of passageways 40 having inlets 42 and outlets 44 at the bottom of the first module 20a and at the top of the second module 20b, respectively. The panels 30 may further define passageway surfaces, at least portions of which may comprise a material adapted for adsorption of elemental and/or oxidized mercury vapor (e.g., sorbent-polymer-composite (SPC) material). Such material may also provide for contact conversion of sulfuric oxides present a in gas stream to sulfuric acid droplets.

In the illustrated embodiments, panels 30 may comprise flat sheets disposed in substantially parallel relation in a given module 20a or 20b. As will be described further hereinbelow, panels 30 may further comprise pleated sheets disposed in alternating relation to the flat sheets (e.g., between successive ones of the flat sheets).

In the embodiment of FIG. 1A, the panels 30 of the first module 20a may be provided so that the top ends thereof are spaced longitudinally (e.g., vertically) from the bottom ends of the panels 30 of the second module 20b. In turn, open spaces 52 are defined along passageways 40, thereby causing perturbation of gas stream portions passing therethrough.

In the embodiment of FIG. 1B, the top ends of the panels 30 of the first module 20a and bottom ends of the panels 30 of the second module 20b may be provided to be offset laterally (e.g., horizontally) to define offset interface regions 54. In turn, the offset interface regions 54 cause perturbation of gas stream portions passing therethrough.

In the embodiment of FIG. 1C, the panels 30 of the first module 20a and the panels 30 of the second module 20b may be provided at an angle relative to one another to define angular interface regions 56. In turn, the angular interface regions 56 cause perturbation of gas stream portions passing therethrough.

The gas stream perturbation approaches shown in FIGS. 1A, 1B, and 1C may be provided in various combinations in different embodiments. For example, in the embodiment of FIG. 2, an integrated device 10 is illustrated comprising five modules 20a, 20b, 20c, 20d, and 20e disposed in adjacent relation for series flow therethrough (e.g., upward flow), wherein the approaches for gas stream perturbation illustrated in FIGS. 1A and 1B above are employed in combination. In particular, the top ends of the panels 30 comprising each of the modules 20a-20d are spaced longitudinally (e.g., vertically) from the bottom ends of the panels 30 comprising each of the corresponding modules 20b-20e, respectively, adjacently positioned thereabove. In turn, open spaces 52 are defined along the passageways 40. Further, the top ends of the panels 30 comprising each of the modules 20a-20d are provided to be offset laterally (e.g., horizontally) relative to the bottom ends of the panels 30 comprising each of the corresponding modules 20b-20e, respectively, adjacently positioned thereabove. In turn, offset interface regions 54 are defined along the passageways 40.

Figure 3:
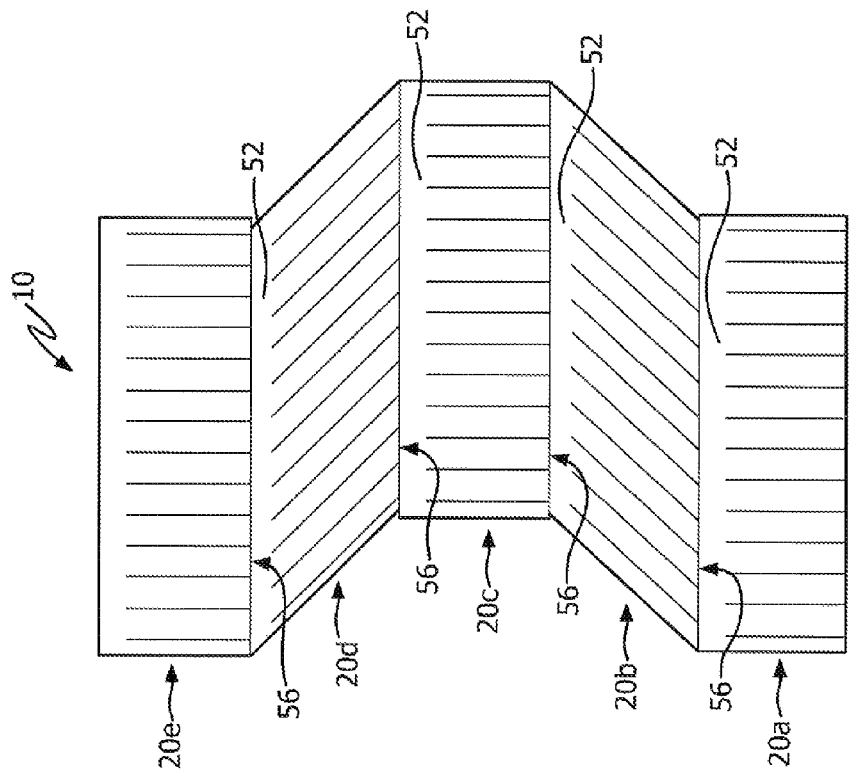
FIG. 3 is a schematic side view of an additional integrated device embodiment having five modules disposed for series gas stream flow therethrough.

In the embodiment of FIG. 3, an integrated device 10 is illustrated comprising five modules 20a, 20b, 20c, 20d, and 20e disposed in adjacent relation for series flow therethrough (e.g., upward flow), wherein the approaches for gas stream perturbation illustrated in FIGS. 1A and 1C above are employed in combination. Again, the top end of the panels comprising each of the modules 20a-20d are spaced longitudinally (e.g., vertically) from the bottom ends of the panels 30 comprising the corresponding modules 20b-20e, respectively, adjacently positioned thereabove, wherein open spaces 52 are defined along the passageways 40. Further, the panels 30 comprising each of the modules 20a-20e are disposed at an angle relative to the panels 30 of adjacent ones of the modules 20a-20e, so as to define angular interface regions 56 along passageways 40.

Additional features may be utilized in conjunction with integrated device embodiments described herein to yield gas stream perturbation and/or otherwise provide for the removal of undesired constituents from a gas stream. In that regard, reference is made to FIGS. 1D, 1E, 1F, and 1G which illustrate a number of optional features, as embodied with the integrated device embodiment of FIG. 1 described above. In FIG. 1D, a non-woven layer 32 may be disposed across the top ends of the panels 30 of module 20a, wherein gas stream portions passing through passageways 40 flow through the non-woven layer 32. Byway of example, non-woven layer 32 may comprise fibrous media (dray laid, wet laid, spunbonds, meltblowns, nanofibers), plastic nettings, and expanded metals. In FIG. 1E, a woven mesh layer 34 may be disposed across the top ends of the panels 30 of module 20a, wherein gas stream portions passing through passageways 40 flow through the woven layer 34. By way of example, non-woven layer 34 may comprise knitted fabrics, wire mesh, and woven screens. In FIG. 1F, a pleated mesh layer 36 may be disposed across the top ends of the panels 30 of module 20a, wherein gas stream portions passing through passageways 40 will flow through the pleated mesh layer 36. By way of example, pleated mesh layer 36 may comprise knitted fabrics, woven screens, and nettings. In FIG. 1G, a gas diversion member in the form of a plurality of vanes 38 may be disposed across the top ends of the panels 30 of module 20a, wherein gas stream portions passing through passageways 40 will be deflected by the vanes 38 as the gas stream portions flow along passageways 40. By way of example, other gas diversion members may take the form of baffles, cyclones, grating, chevrons, beveled surfaces, etc.

Reference is now made to FIGS. 4A and 4B, and FIGS. 5A and 5B, which illustrate embodiments of frame member employable in integrated device embodiments. As will become apparent hereinbelow, each of the frame members shown in FIGS. 4A and 4B, and 5A and 5B may supportably receive panels therewithin to define passageways having passageway surfaces, wherein at least portions of the passageway surfaces comprise a material adapted for adsorption of elemental and/or oxidized mercury vapor.

Figure 4A:
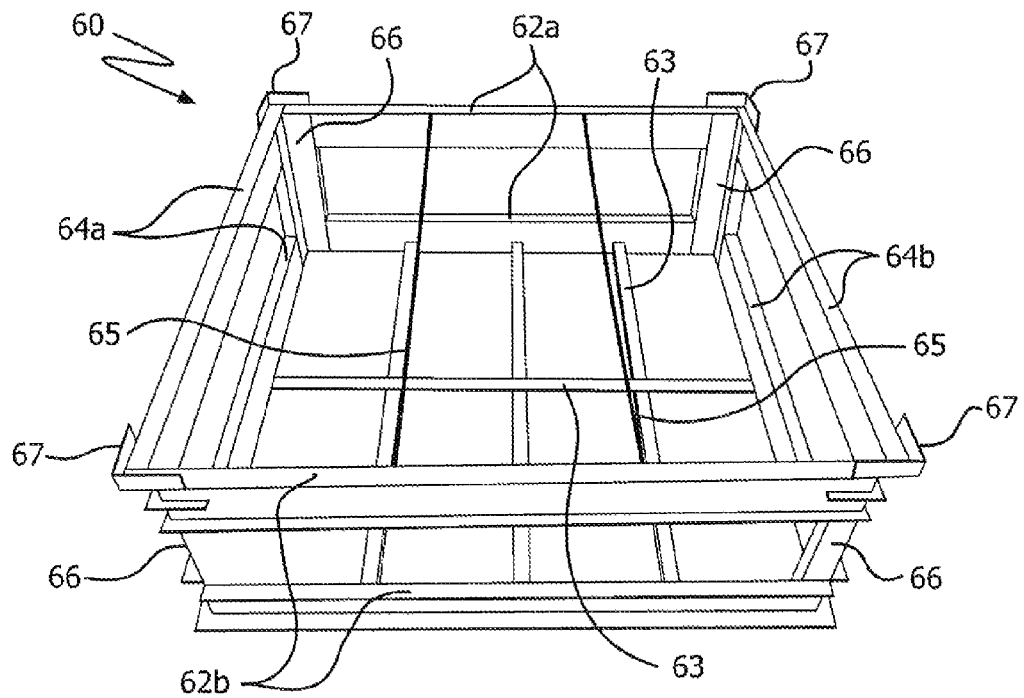
FIG. 4A is a first side view of a frame member employable in one or more of the integrated device embodiments of FIGS. 1A, 1B, 1C, 2, and 3.
Figure 4B:
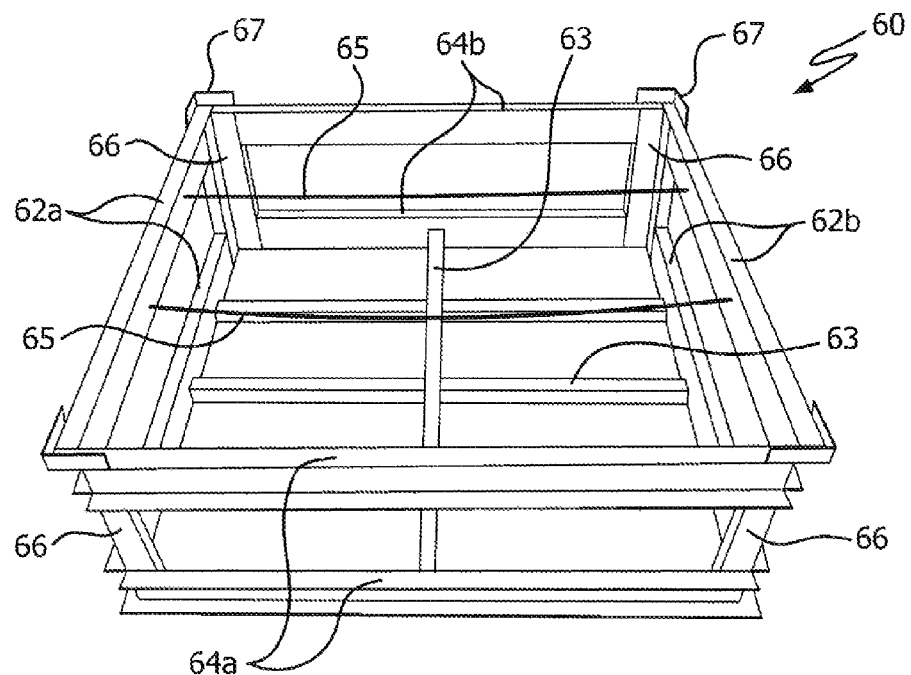
FIG. 4B is another side view of the frame member embodiment shown in FIG. 4A.

In FIGS. 4A and 4B, frame member 60 is of a right rectangular prism configuration having opposing first side members 62a, 62b fixedly interconnected to opposing second side members 64a, 64b at corner members 66. Bottom support members 63 may be interconnected to the first side members 62a, 62b and/or second side members 64a, 64b for support of panel members thereupon. Further, removable retention members 65 (e.g., attachable/detachable cable lengths) may be provided across the top of frame member 60 (e.g., between first side members 62a, 62b or between second side members 64a, 64b) to facilitate handling of the frame member 60 with panel members contained therein, and facilitate replacement of panel members and repeated use of the frame member 60. Optionally, stack members 67 may be provided on the top of the frame member 60 to facilitate stable, stacked positioning of a plurality of frame members. As shown, the stack members 67 may be configured as upstanding corner flanges attached to the top side of frame member 60 at one or more of the corners thereof so as to restrict lateral movement (e.g., in each of two dimensions) of another frame member stacked thereupon.

Figure 5A:
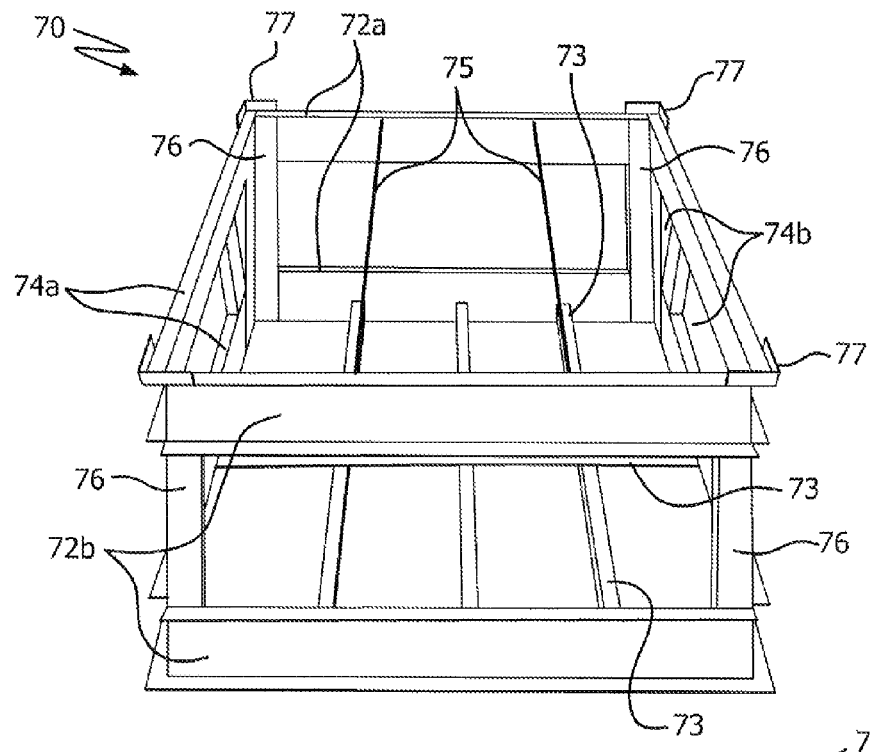
FIG. 5A is a first side view of another frame member employable in one or more of the integrated device embodiments of FIGS. 1C and 3.
Figure 5B:
FIG. 5B is another side view of another frame member embodiment shown in FIG. 5A.

In FIGS. 5A and 5B, frame member 70 is of an oblique rectangular prism configuration having opposing first side members 72a, 72b fixedly interconnected to opposing second side members 74a, 74b at corner members 76. As shown in FIG. 5B, side members 74a, 74b may adjoin corner members 76 to define a parallelogram configuration in one view. Bottom support members 73 may be interconnected to the first side members 72a, 72b and/or second side members 74a, 74b for support of panel members thereupon. Further, removable retention members 75 (e.g., attachable/detachable cable lengths) may be provided across the top of frame member 70 (e.g., between first side members 72a, 72b or between second side members 74a, 74b) to facilitate handling of the frame member 70 with panel members contained therein and facilitate replacement of panel members and repeated use of the frame member 70. Optionally, stack members 77 may be provided on the top of the frame member 70 to facilitate stable, stacked positioning of a plurality of frame members. As shown, the stack members 77 may be configured as upstanding corner flanges attached to the top side of the frame member 70 at one or more of the corners thereof so as to restrict lateral movement of another frame member stacked thereupon.

As may be appreciated, the frame member 60 shown in FIGS. 4A and 4B may be utilized in integrated device modules having a plurality of modules that may be stacked to define the configurations shown in the embodiments of FIGS. 1A, 1B, and 3. Further, the frame member 60 shown in FIGS. 4A and 4B, and the frame member 70 shown in FIGS. 5A and 5B, may be utilized in integrated device modules having a plurality of modules that may be stacked to define the configurations shown in the embodiments of FIGS. 1C and 3.

Figure 6:
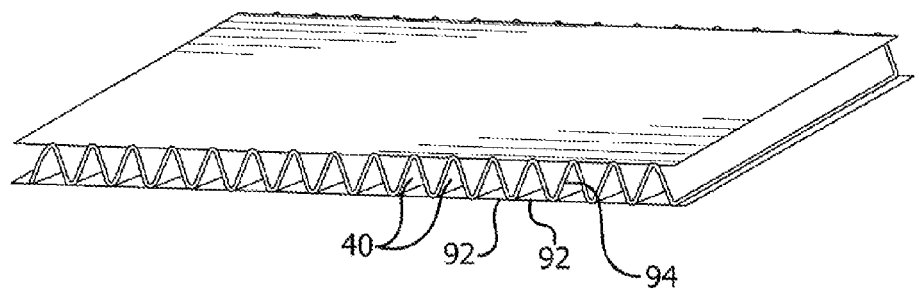
FIG. 6 is a perspective view of a panel embodiment employable in one or more of the integrated device embodiments of FIGS. 1A, 1B, 1C, 2, and 3.

As noted above, the frame member 60 shown in FIGS. 4A and 4B, and the frame member 70 shown in FIGS. 5A and 5B may supportably receive panels therewithin to define passageways and passageway surfaces. In one approach, FIG. 6 illustrates flat sheets 92 having a pleated sheet 94 therebetween. Such exemplary arrangement yields a plurality of triangular passageways 40. As will be further described hereinbelow, a plurality of flat sheets 92 and pleated sheet 94 may be alternatively arranged upright on their respective edges within a frame member, wherein upward oriented passageways 40 are defined for gas stream flow therethrough. The frame member may support and laterally contain the flat sheets 92 and pleated sheets 94 in adjacent, side-by-side relation, free from any direct interconnection between the flat sheets 92 and pleated sheets 94, or between such sheets and the frame member or other components, thereby simplifying assembly and servicing removal/replacement of the pleated sheets and flat sheets.

The flat sheets 92 and/or pleated sheets 94 may include surface portions comprising a material adapted for adsorption of elemental and oxidized mercury vapor present in a gas stream. Such material may also provide for contact conversion of sulfuric oxides present in a gas stream to sulfuric acid. By way of primary example, such material may comprise a sorbent-polymer-composite (SPC) material.

In various embodiments, each of the pleated sheet 94 and/or flat sheets 92 may comprise a middle layer laminated between outer tape layers comprising an SPC material. The middle layer may be provided to enhance the shape-holding attributes of the sheets. Enhanced shape-holding characteristics of the pleated sheets 94 and flat sheets 92 may be provided by lamination of a melt-processable resin layer between two layers of SPC tape. In turn, a thicker construction may be realized. The thicker construction and middle resin layer provide sufficient stiffness to maintain open passageways 40 for gas flow during use. Polyvinylidene fluoride (PVDF) is a melt-processable fluoropolymer resin which provides the necessary stiffness as well as the chemical and thermal resistance properties desired for wet scrubber conditions. Further, the pleated sheets 94 and/or flat sheets 92 may be substantially gas impermeable (e.g., wherein gas stream flow is restricted to flow along and between the surfaces of the sheets).

In some embodiments, exposed surface portions of the flat sheets 92 and/or pleated sheet 94 may include an SPC material in which the polymer material includes a fluoropolymer. More particularly, the fluoropolymer material may comprise a fluoropolymer selected from a group comprising of polytetrafluoroethylene (PTFE), polyfluoroethylene propylene (PFEP); polyperfluoroacrylate (PPFA); polyvinylidene fluoride (PVDF); a terpolymer of tetrafluoroethylene, hexafluoropropylene and vinylidene fluoride (THV); polychloro trifluoro ethylene (PCTFE), and other copolymers or terpolymers containing at least one fluoromonomer with or without additional non-fluorinated monomers. Further, the SPC material may comprise a sorbent material that has been treated with at least one chemical substance selected from a group comprising: alkaline metal iodides, organic iodide compounds, vanadium oxides, metal sulfates, elemental sulfur, sulfuric acid, oxides of iodine, chlorides of potassium, bromides of potassium, chlorides of sodium, bromides of sodium, chlorides of ammonium, bromides of ammonium, iodides of ammonium, zinc acetate and iodide coordination complexes.

Figure 7A:
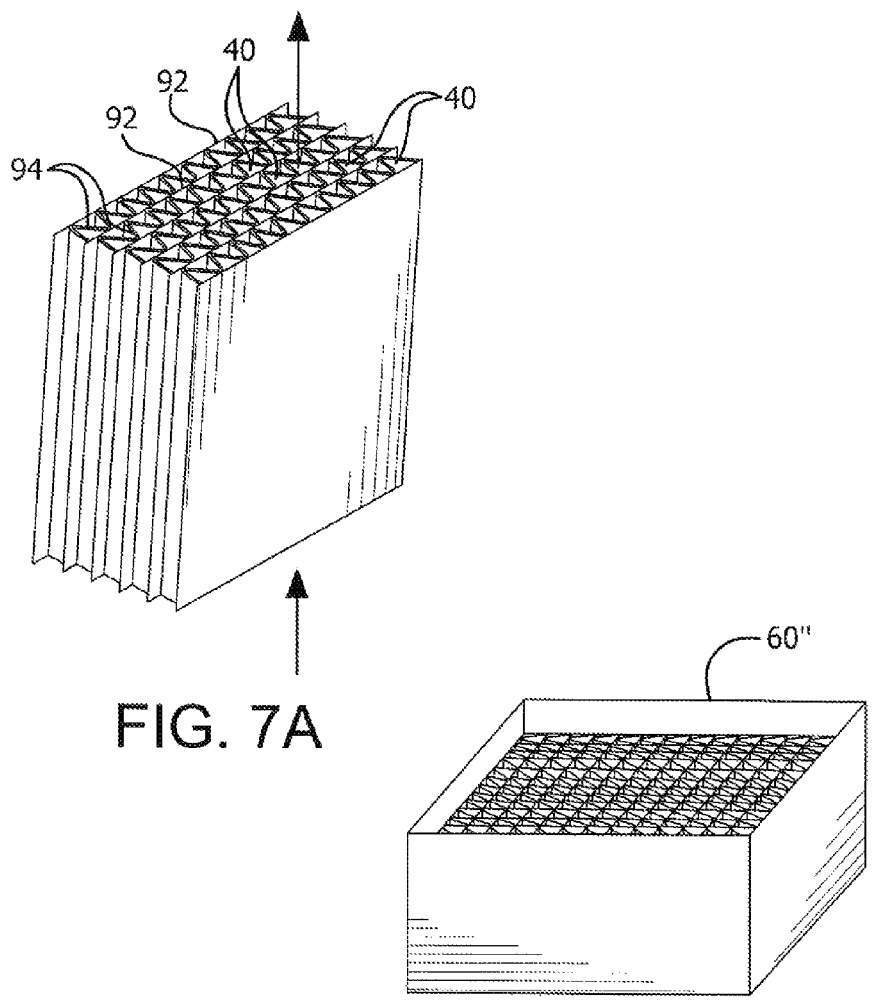
FIG. 7A is a perspective view of a plurality of flat and pleated sheets employable in one or more of the integrated device embodiments of FIGS. 1A, 1B, 1C, 2, and 3.
Figure 7B:
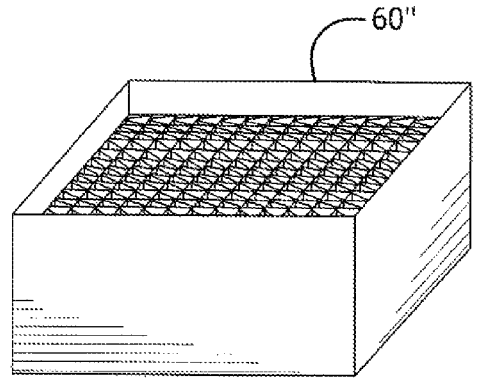
FIG. 7B is a perspective view of a module embodiment including a plurality of flat and pleated sheets as shown in FIG. 7A.

Reference is now made to FIGS. 7A and 7B which illustrate a plurality of layers of flat sheets 92 and pleated sheets 94 arranged in an upright and alternating, side-by-side manner, wherein the flat sheets 92 and pleated sheets 94 may be disposed in parallel relation. In FIG. 7b, the alternating sheets are illustrated as contained in a frame member 60' of a module, corresponding in general configuration with the frame member 60 shown in FIGS. 4A and 4B. As shown, the sheets may be oriented in perpendicular relation to a plane corresponding with open ends of the frame member 60'. In FIG. 7A the frame member 60' is removed for purposes of illustration. During assembly the frame member 60' may be disposed on one side thereof, wherein the flat sheets 92 and pleated sheets 94 may be alternately positioned horizontally and stacked within the frame member 60'. As may be appreciated, frame member 60' may also be filled with alternating ones of the flat sheets 92 and pleated sheets 94 with frame member 60' in an upright position as shown in FIG. 7B. In either case, the flat sheets 92 and pleated sheets 94 may be maintained in upright (e.g., vertical), adjacent relation by frame member 60', and as noted above, otherwise provided to maintain their flat and pleated configurations during use in corrosive conditions at elevated temperatures (e.g., up to 80° C.).

Figure 8A:
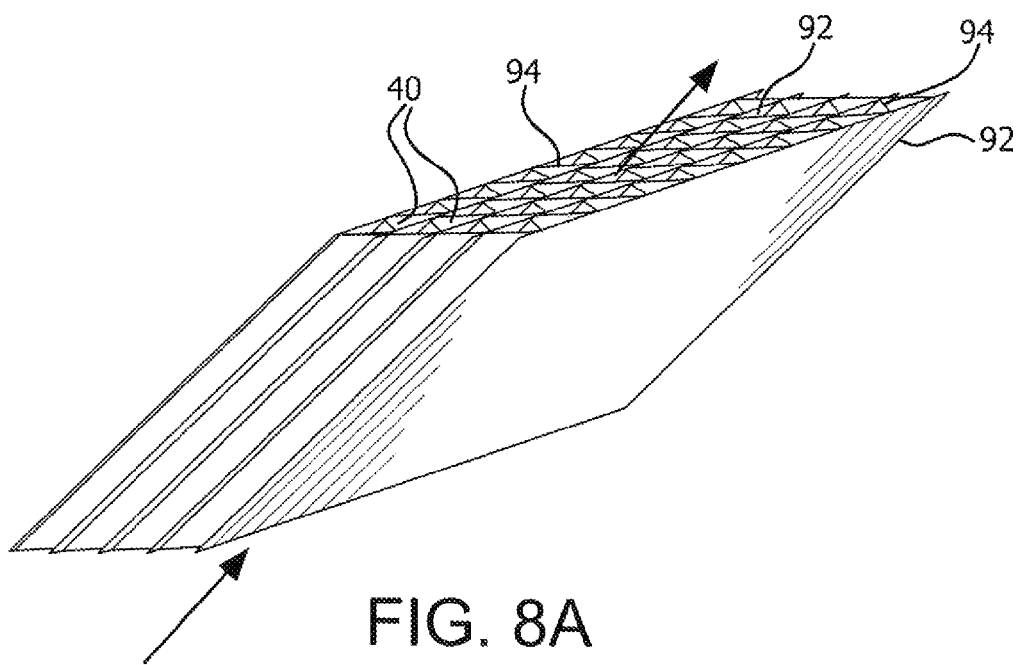
FIG. 8A is a perspective view of a plurality of angled flat and pleated sheets employable in one or more of the integrated device embodiments of FIGS. 1C and 3.
Figure 8B:
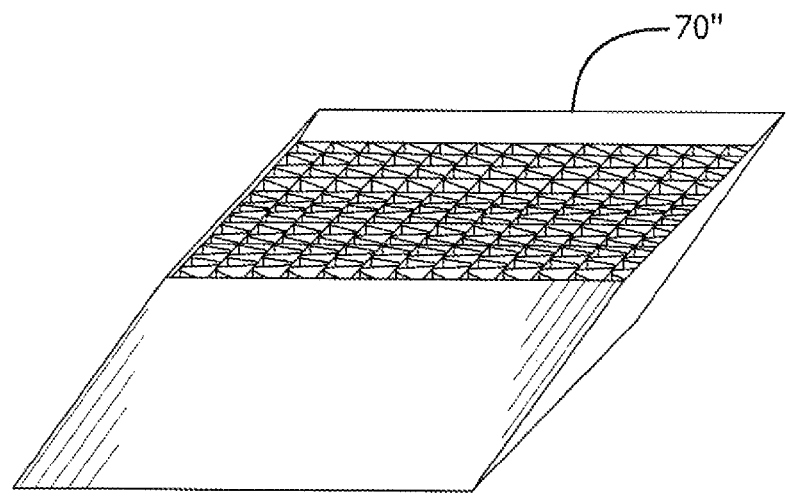
FIG. 8B is a perspective view of a module embodiment including a plurality of flat and pleated sheets as shown in FIG. 8A.

Reference is now made to FIGS. 8A and 8B, which illustrate a plurality of layers of flat sheets 92 and pleated sheets 94 arranged in an upright and alternating side-by-side manner, wherein the flat sheets 92 and pleated sheets 94 may be disposed in parallel relation. In FIG. 8B, the alternating sheets are illustrated as contained in a frame member 70' of a module corresponding in general configuration with the angled frame member 70 shown in FIGS. 5A and 5B. As shown, the sheets may be oriented in non-perpendicular, or angular, relation to a plane corresponding with open ends of the frame member 70'. In FIG. 8A the frame member 70' is removed for purposes of illustration. As shown, the bottom edges and top edges of flat sheets 92 and pleated sheets 94 may be angled, or crosscut at an angle (e.g., via a miter cut) corresponding with the angled frame member 70', to facilitate positioning (e.g., coincidental, or conformal, positioning) in the angled frame member 70.

During assembly, the frame member 70 may be disposed on one side thereof, wherein the flat sheets 92 and pleated sheets 94 may be alternately positioned horizontally and stacked within the frame member 70'. As may be appreciated, frame member 70' may also be filled with alternating ones of the flat sheets 92 and pleated sheets 94 with frame member 70' in an upright position as shown in FIG. 8B. In either case, the flat sheets 92 and pleated sheets 94 may be maintained in upright, angled, and adjacent relation by frame member 70', and as noted above, otherwise provided to maintain their flat and pleated configurations during use in corrosive conditions at elevated temperatures.

Figure 9:
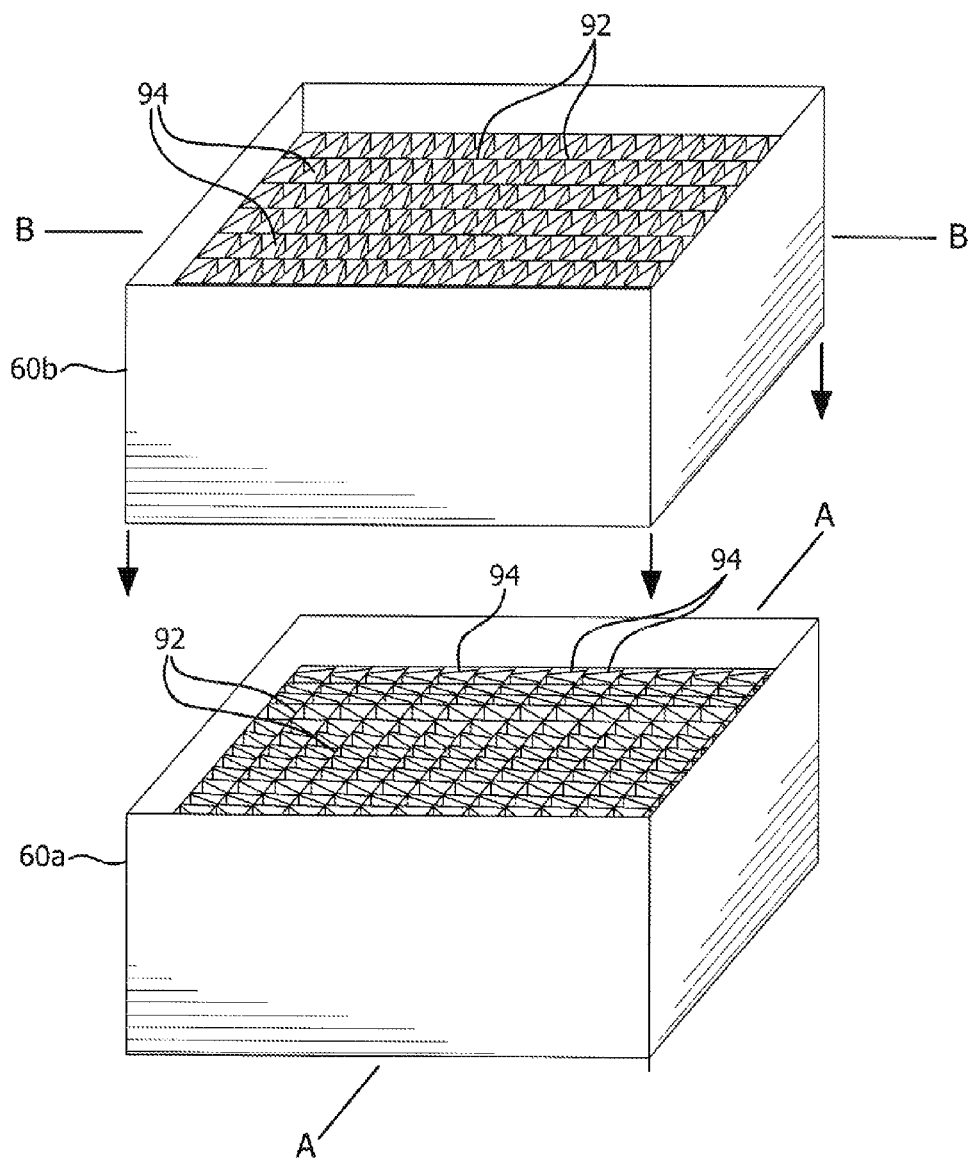
FIG. 9 is a perspective view of two units of the module embodiment shown in FIG. 7B, arranged in different orientations for series gas flow therethrough.

In another arrangement shown in FIG. 9, a plurality of modules (60a, 60b) in a form as shown in FIG. 7b may be stacked so that the layers of flat sheets 92 and layers of pleated sheets 94 in different ones of the modules are disposed, or otherwise extend, in non-parallel, transverse planes. For example, parallel layers of sheets in a first module 60a may lie in or otherwise be centered on corresponding parallel planes that extend along a common first direction AA, and parallel layers of sheets in a second module 60b may lie in or otherwise be centered on corresponding parallel planes that extend along a common second direction BB, wherein the second direction BB is different than the first direction AA.

Figure 10:
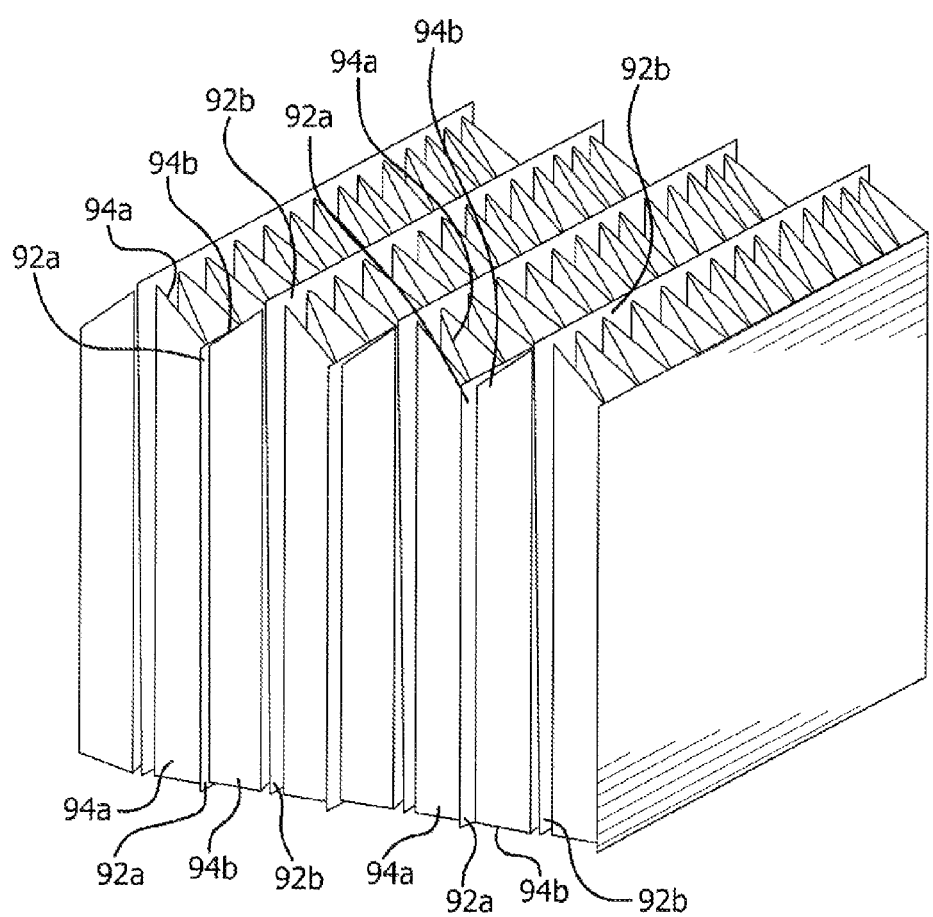
FIG. 10 is a perspective view of a plurality of flat and pleated sheets having tapered, or angled, top edge surfaces employable in integrated device embodiments hereof.

In yet another arrangement shown in FIG. 10, a plurality of layers of flat sheets 92a, 92b and pleated sheets 94a, 94b may be arranged in an upright and alternating, side-by-side manner, wherein the sheets are disposed in parallel relation, e.g., as when located within a frame member embodiment described herein. As illustrated, top edges of at least a portion or all of the pleated sheets 94a, 94b, may be tapered or otherwise angled (e.g., relative to a frame member in use), so as to be disposed at an angle relative to a horizontal plane. In turn, any liquid-containing droplets formed upon such top edges or the pleated sheets 94 may drain off such edges of the sheets. In the arrangement shown in FIG. 10, alternating pleated sheets 94a and pleated sheets 94b (only sides of the end pleats of pleated sheets 94b are shown) have corresponding top edges that angle downwards toward each other, to define V-shaped top end regions. In turn, alternating flat sheets 92a and 92b have shorter and taller heights, respectively, as shown.

Figure 11:
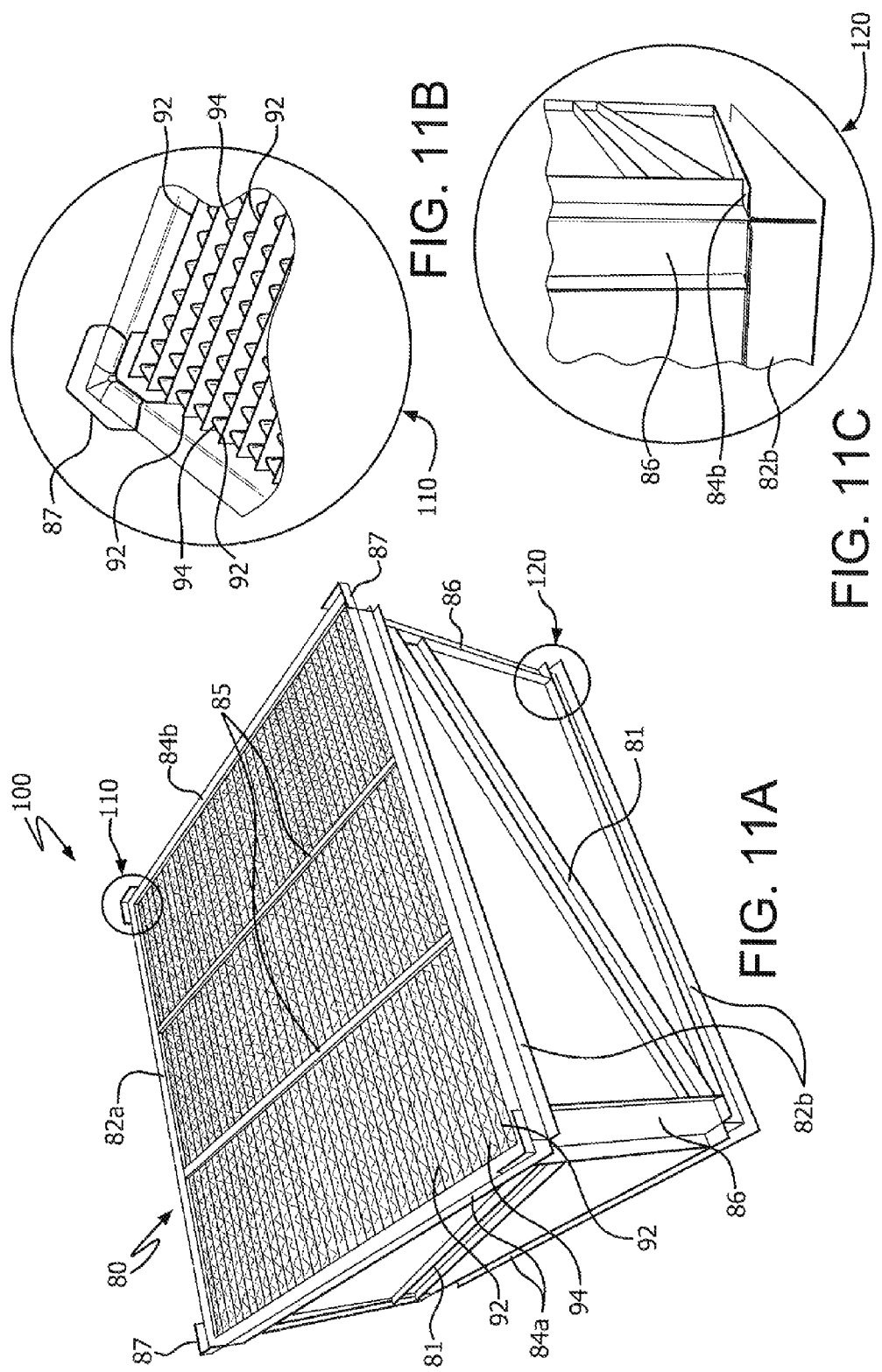
FIG. 11A is a perspective view of another integrated device embodiment having alternating flat and pleated sheets.
FIG. 11B is a perspective view of a corner portion 110 of the integrated device embodiment shown in FIG. 6A.
FIG. 11C is a perspective view of another corner portion 120 of the integrated device embodiment shown in FIG. 6A.

Reference is now made to FIGS. 11A, 11B, and 11C which illustrate a module 100 comprising a frame member 80 and panels comprising alternating layers of flat sheets 92 and pleated sheets 94 supportably contained by the frame member 80. The frame member 80 is of a right rectangular prism configuration having opposing first side members 82a, 82b fixedly interconnected to opposing second side members 84a, 84b at corner members 86. In this embodiment, additional angled side members 81 are diagonally interconnected to between different ones of the corner members 86 on each of the four sides of the frame member 80 to provide added structural support. Bottom members (not shown) may be interconnected to the first side members 82a, 82b and/or second side members 84a, 84b for support of the flat sheets 92 and pleated sheets 94 thereupon. Further top retention members 85 may be provided across the top of the frame member 80. As shown, stack members 87 may be provided on the top of the frame member 80 to facilitate stable, stacked positioning of a plurality of frame members. In this regard, a corner region 110 of the module 100 is shown in FIG. 11B.

As shown in FIG. 11B, stack members 87 may be configured as upstanding corner flanges attached to the top side of the frame member 80. As further illustrated in FIG. 11B, the alternating layers of flat sheets 92 and pleated sheets 94 may be provided so that triangular shaped passageways are defined between successive ones of the flat sheets 92 by the pleated sheet 94 disposed therebetween. As may be appreciated, such triangular passageways may extend between the open bottom and top sides of the integrated module 100.

To facilitate stable, stacked positioning of a plurality of frame members, the first side members 82a, 82b and second side members 84a, 84b may be structurally defined and interconnected to corner members 86 as illustrated by region 120 of FIG. 11A shown in FIG. 11C. As illustrated, first side member 82b and second side member 84b may be defined by U-shaped channel members which are fixedly interconnected to adjacent outward facing surfaces of corner member 86, wherein projecting flange portions are provided at the bottom corners for stable, conformed receipt within stack members of another module position therebelow.

As noted above, integrated device embodiments disclosed herein may be utilized for the treatment of gas streams to remove constituents thereof, including in particular, use in wet scrubbers. In this regard, the integrated device embodiments may be employed to remove elemental and oxidized mercury vapor present in an exhaust gas streams treated in wet scrubber, and further to provide mist elimination functionality by removal of liquid-containing droplets present in the gas stream. Such dual functionality provides advantages relative to prior art wet scrubber arrangements.

Figure 12:
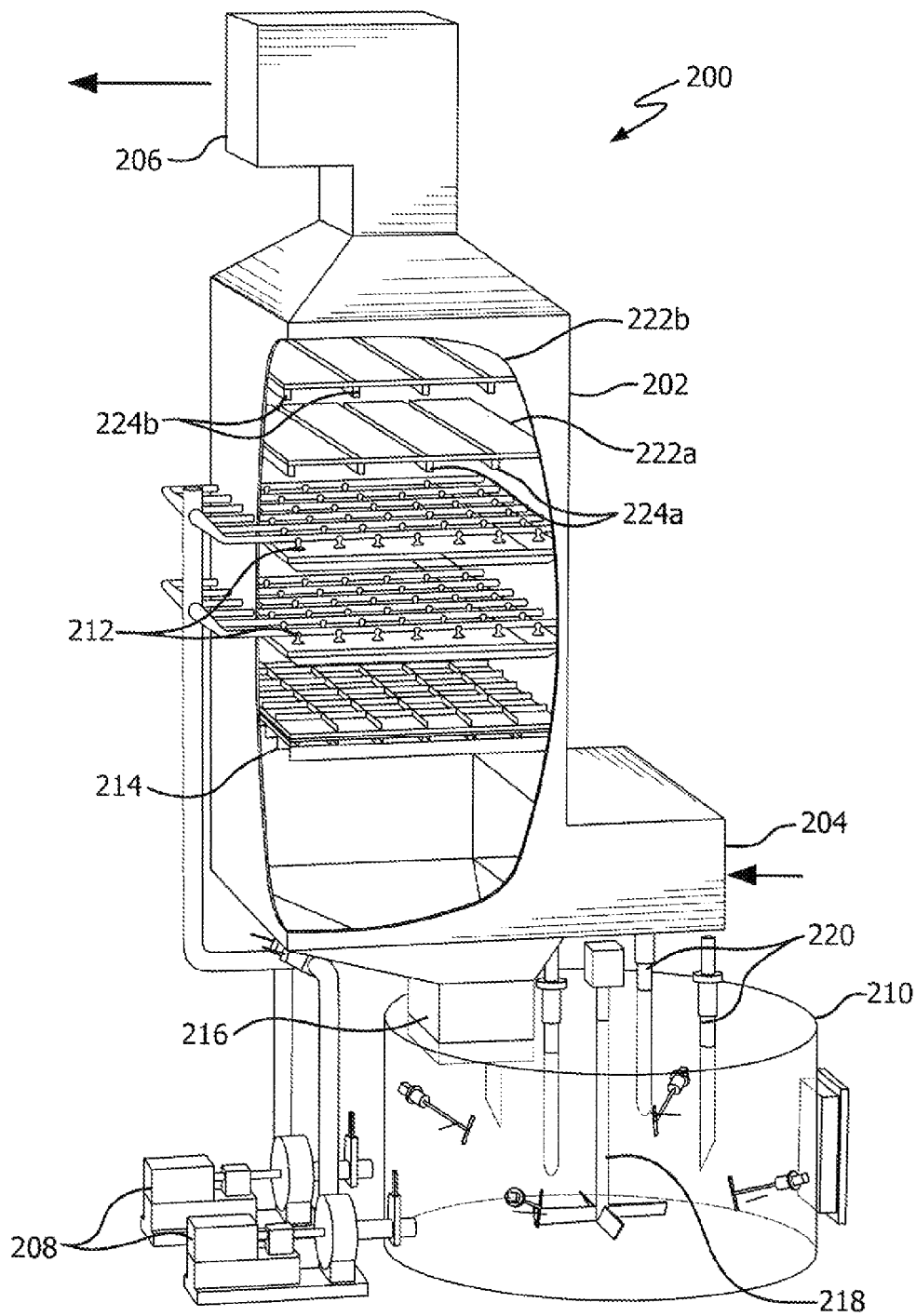
FIG. 12 is a perspective, partial cutaway view of a prior art wet scrubber.

In that regard, reference is made to FIG. 12 which illustrates a prior art wet scrubber 200. The wet scrubber 200 includes an enclosed housing 202, a gas inlet 204 for passage of untreated flue gas into the housing 202, and a gas outlet 206 for passage of treated flue gas out of housing 202. The wet scrubber 200 may further include pumps 208 for pumping liquid from a reaction tank 210 through spray assemblies 212. The liquid spray from spray assemblies 212 may be directed downward towards a gas distribution tray 214 that is located above the gas inlet 204. In turn, undesired constituents of the untreated flue gas may be removed therefrom by the liquid spray and removed from the housing 202 via a bottom port 216, wherein the removed liquid and undesired constituents flow into reaction tank 210. As may be appreciated, an agitator 218 may be utilized within reaction tank 210. Further, an oxidation air supply 220 may be provided at reaction tank 210.

As illustrated in FIG. 12, one or more mist eliminators 222 may be positioned above the spray assemblies 212 for removal of liquid-containing droplets from a gas stream prior to passage through gas outlet 206. Typically, a first stage mist eliminator 222a and second stage mist eliminator 222b are utilized, wherein the second stage mist eliminator 222b is provided to have a greater capability to remove smaller droplets than the first stage mist eliminator 222a. Stated differently, the first stage mist eliminator 222a may be provided, or optimized, to remove liquid-containing droplets larger than a predetermined size, and the second stage mist eliminator 222b may be provided, or optimized, to remove liquid-containing droplets that are smaller than the predetermined size. As shown in FIG. 12, the first stage mist eliminator 222a may be supported by support members 224a fixedly interconnected to or relative to housing 202. Further, the second stage mist eliminator 22b may be supported by support members 224b fixedly interconnected to or relative to housing 202.

Figure 13:
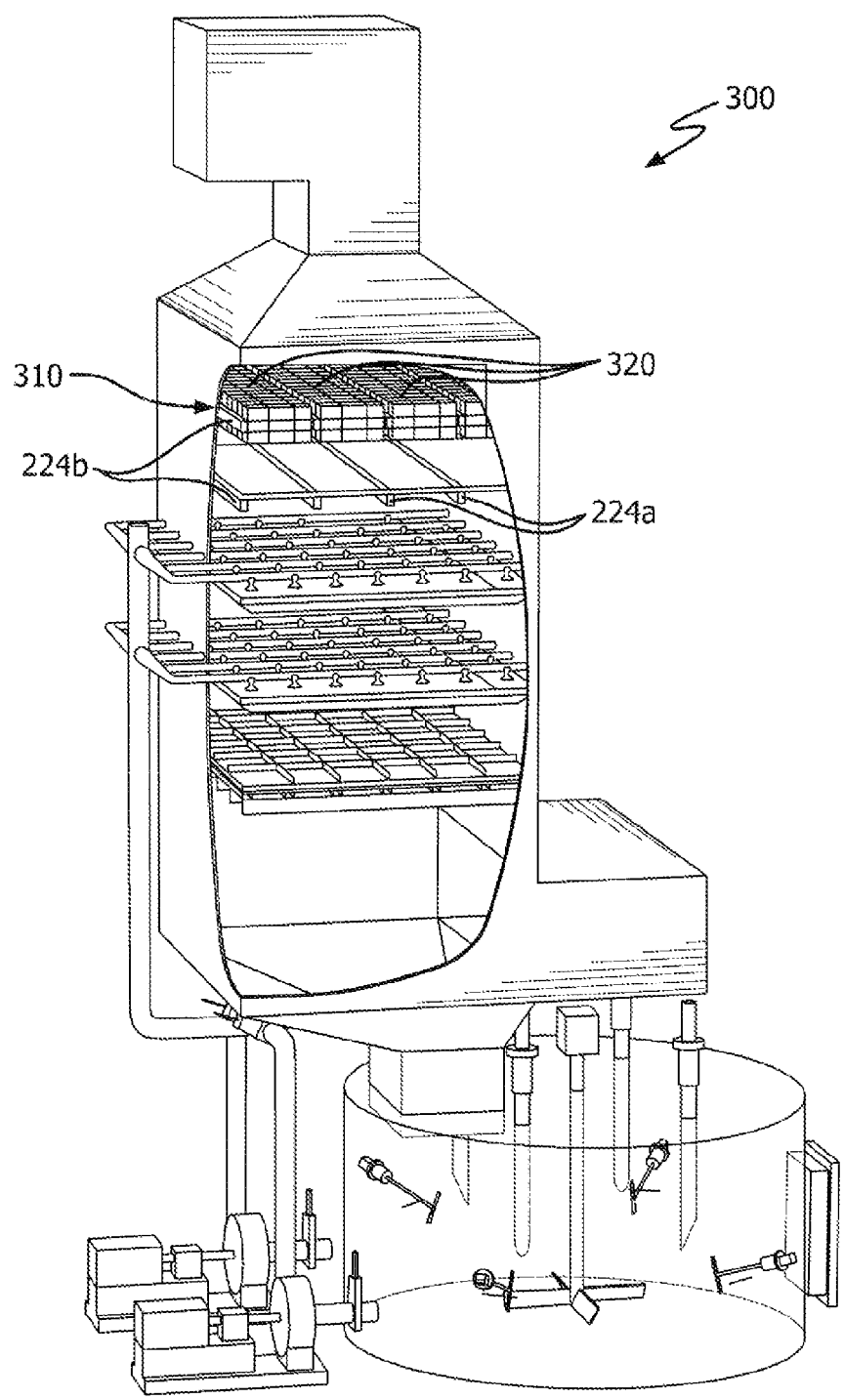
FIG. 13 is a perspective, partial cut-away view of a wet scrubber embodiment having an integrated device embodiment installed therein.

In one implementation embodiment, integrated device embodiments described herein may be installed in a wet scrubber as of the type shown in FIG. 12 as modified in the manner illustrated by FIG. 13. As shown in FIG. 13, in wet scrubber 300 the second stage mist eliminator 222b discussed above in relation to FIG. 12 has been removed from the support members 224b. In turn, and as illustrated in FIG. 13, an integrated device embodiment 310 comprising a plurality of modules 320, as described above, may be located in at least a portion of the region from which the second stage mist eliminator 222b was removed. In the illustrated example, a plurality of modules 320 may be supported in stacked relation by support members 224b (e.g., two or more stacked modules in one or more rows and one or more columns). In some implementations, open support grids (e.g., comprising cross-welded beams) for modules 320 may be installed as needed.

Figure 14:
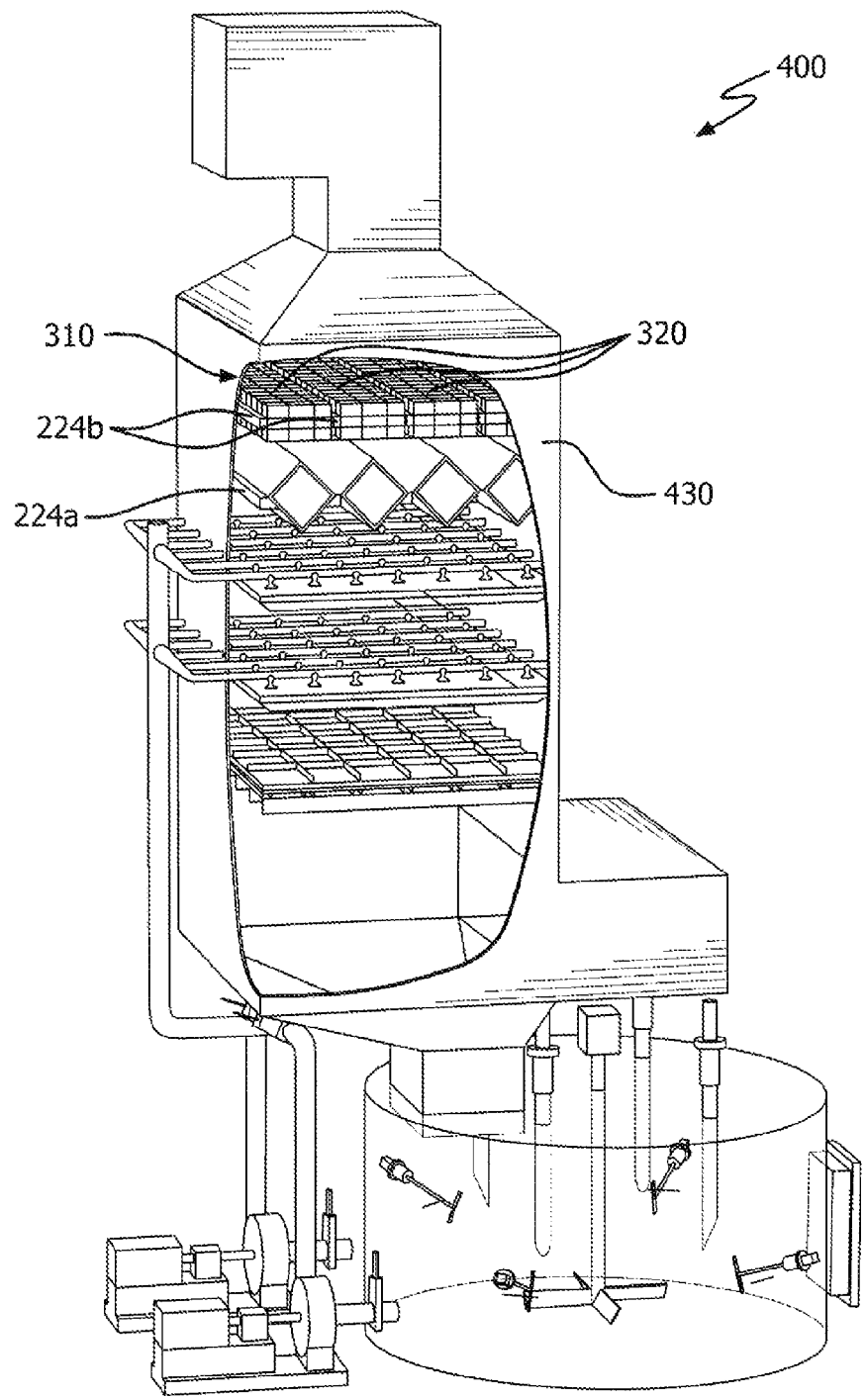
FIG. 14 is another perspective, partial cutaway view of another wet scrubber embodiment having an integrated device embodiment installed therein.

Another embodiment of a method of implementation is shown in FIG. 14. As illustrated, in wet scrubber 400 the first stage mist eliminator 222a shown in FIG. 12 may be removed and replaced by a known mist eliminator 422 (i.e., Model DV 210, available from Munters Corporation, Fort Myers, Fla., USA) that provides first stage 422a and second stage 422b mist elimination utilizing a single common support structure, e.g. support members 224a. In turn, and as illustrated in FIG. 14, an integrated device embodiment 310 comprising a plurality of modules 320, as described above, may be located in at least a portion of the region from which the second stage mist eliminator 222b was removed. In the illustrated example, modules 320 may be supported in stacked relation by support members 224b.

EXAMPLES

Test measures are described below, followed by descriptions of examples testing and of the examples according to the test measures, results of the testing.

Mist Elimination Performance Test

The mist collection efficiency is determined using a Phase Doppler Particle Analyzer (PDPA). Phase Doppler measurements allow for the sizing of spherical liquid particles and determination of their velocities. It splits a laser beam into two and converges them into a small measuring volume. The interference of the two laser beams creates fringes, that is, light and dark lines. As particle moves through the measuring volume, it scatters these fringes all around, including some towards the optical receiver. The frequency of the scattered light determines the velocity of the particle. The spatial frequency (spacing between the scattered fringes at the light collecting optics) of the scattered fringes contains information about the size of the particle being measured. The spatial frequency is measured as a phase shift between the two electrical signals resulting from the scattered light. This phase shift can then be related to particle size.

The test module is installed in a test duct with a 43 cm×43 cm cross-section. The PDPA measures the droplet velocities and sizes at a distance of 30.5 cm from the exiting surface of the module. The PDPA system (available from TSI Inc., Shoreview, Minn.) consists of a laser, a photodetector, and a signal processor. It is setup to measure droplets from 0.65 to 259 microns in diameter with a laser having a wavelength of 514.5 nm. The laser and photodetector are mounted onto a linear track to allow the instrument to traverse across the test duct. Measurement is taken from the center of the test duct to 17.8 cm off to one side. The traverse time is adjusted according to the droplet concentration. The initial concentration is measured before the test begins and the sampling time is set such that approximately 100,000 particles will be counted.

Fine water mist is generated by a spray nozzle (Model TD5-088, BETE Fog Nozzle, Inc.; Greenfield, Mass.) operated at 68.9 bar. The liquid water drops measured by the PDPA system has a Sauter diameter (the diameter of a drop whose area to volume ratio is the same as that of the entire sample) of 36 microns and a DV90 (the diameter such that the collection of drops whose diameter is below this value represents 90% of the sample volume) of 70 microns. The water feed rate is 61 liter/min/m². The mist eliminator is sprayed for 70 minutes before testing begins.

Droplet Removal Efficiency

The droplet removal efficiency according to size is calculated according to $$E_i(\%) = 100 - \frac{N_i/t}{\overline{N}_i/\overline{t}} \times 100$$

where $N_i$ is the number of particles of size i detected, and t the sampling time in seconds when the modules are installed, and $\overline{N}_i$ and $\overline{t}$ are the number of particles of size i and the sampling time in seconds when the modules are not installed.

Carryover

The carryover is the total amount of liquid droplets detected downstream of the modules. It is calculated by determining the total volume of droplets passing through module and normalized to the measurement volume of the PDPA:

Stiffness

The laminate stiffness was measured using a Gurley 4171 Bending Resistance Stiffness Tester to measure the force required to bend a sample under controlled and repeatable conditions. A rectangular sample measuring 8.9 cm×5.1 cm was attached to a clamp, with the longer side of the sample extending downward. The bottom 6 mm of the sample overlapped the top of the pointer, (a triangular shaped vane). During the test, the sample was moved against the top edge of the vane, moving the pendulum until the sample bent and released it. The point of release was measured by an optical encoder and displayed on a digital readout. The tests were performed in both the left and right directions. The instrument calculated the average force to bend the sample after each measurement was performed. The results were displayed in units of force (milligrams).

I—Example A Straight-Through Modules

Figure 2:
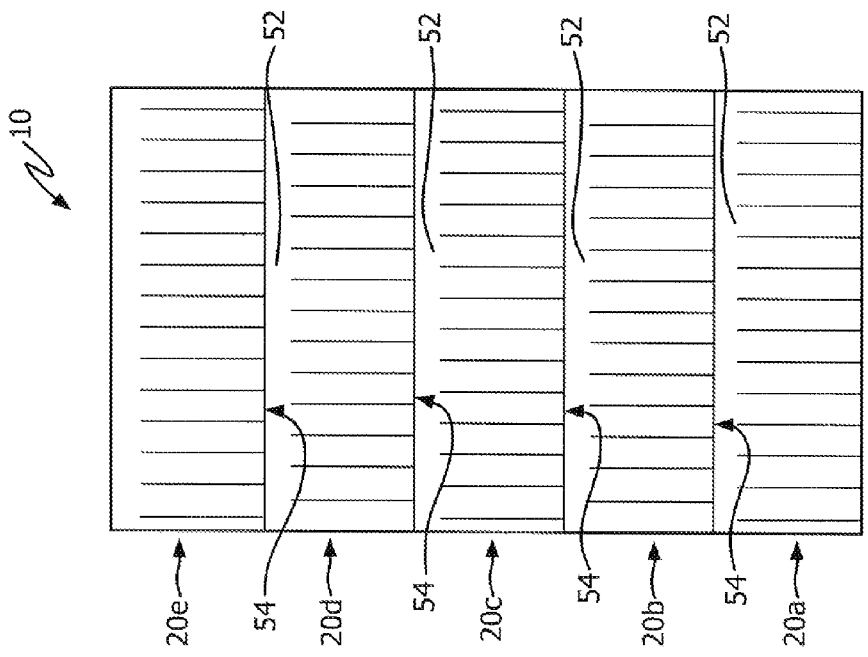
FIG. 2 is a schematic side view of an additional integrated device embodiment having five modules disposed for series gas stream flow therethrough.

An integrated device with mercury removal and mist elimination consists of five straight modules in series, as schematically shown in FIG. 2. The straight module is made by placing SPC tapes into a metal frame. SPC tape is produced by blending activated carbon powder with PTFE powder suspended in an emulsion. The blended powders are dried and lubricated with a mineral oil or water/alcohol mixture to form dough. The dough is extruded using a conventional extruder to form an extrudate. The lubricant is then removed from the extrudate by drying and the dried extrudate is then calendared into a sheet form under elevated temperature. The sheet is then stretched at high temperature to develop the microporous structure. The sheet product is laminated to both sides of a PVDF sheet to form a laminated sheet with a thickness of 1 mm. The flat sheet tape is then pleated to a pleat height of 12 mm and spacing of 10 mm to form a corrugated material.

A stack of SPC tapes are inserted into a stainless steel frame with an internal dimensions of 529 mm by 406 mm by 165 mm (width×depth×height). The SPC tapes alternate between flat sheet and pleated forms to form a passage to allow airflow, mercury adsorption and mist elimination. The flat sheet tape and pleated tape are 529 mm by 152 mm. A total of 23 pairs of flat sheet and pleated tapes are inserted into a single module.

Five modules are stacked on top of one another to form the integrated device. A gap of 13 mm separates the exit plane of the SPC tapes of the first module to the inlet plane of the bottom surface of the second module. The total stack height is 826 mm. The aforementioned mist elimination test is performed on the integrated device.

I—Example B Angled Modules

An integrated device with mercury removal and mist elimination consists of three straight modules and two angled modules in series, as schematically shown in FIG. 3. The SPC tapes are made according to Example A. The angled module has a frame with two parallel side walls inclined at an angle of 45 degrees. The SPC flat sheet and pleated tapes, alternating between one and the other, fill the volume inside the frame at the inclined angle created by the side walls. The flat sheet tape is 529 mm by 152 mm. The pleated tape is 165 mm. The edge of the pleated tape is mitered at 45 degrees on both sides in parallel to create a flat surface when it is inserted into the angled frame. There are a total of 19 alternating pleated and flat sheets of SPC materials in each angled frame.

The order of the straight and angled modules, from bottom to top, are as follow: straight; angled; straight; angled (rotated 90 degree relative to first angled frame); straight; angled (rotated 90 degree relative to the second angled frame). This configuration creates a zigzag flow path to further remove the liquid droplets. The total stack height is 826 mm.

I—Comparative Example

A commercial vane mist eliminator (i.e., Model T-271, available from Munters Corporation, Fort Myers, Fla., USA) is cut to fit inside a straight module as described in Example A. The unit is 529 mm by 406 mm by 152 mm. The unit is made of polypropylene. Spacing between two blades is 25.4 mm.

I—Results

Figure 15A:
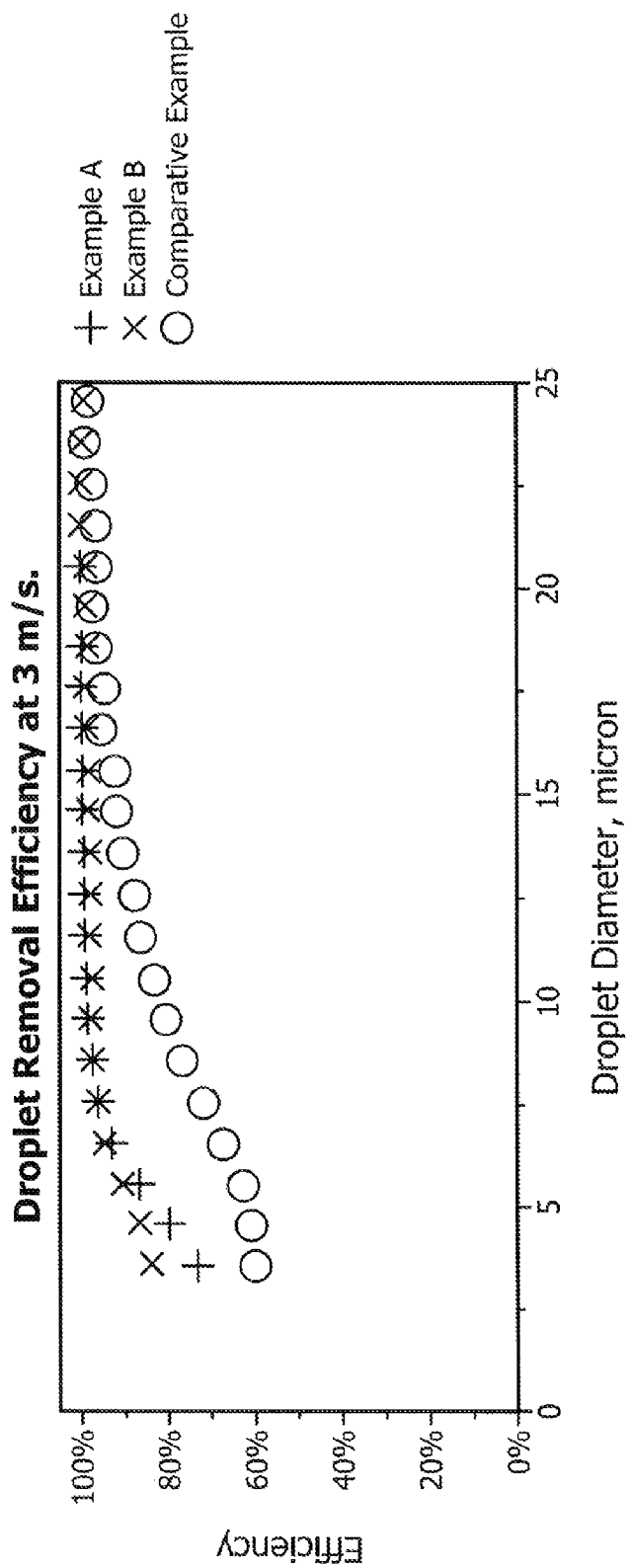
FIGS. 15A, 15B, and 15C illustrate comparative performance charts in a first example.
Figure 15B:
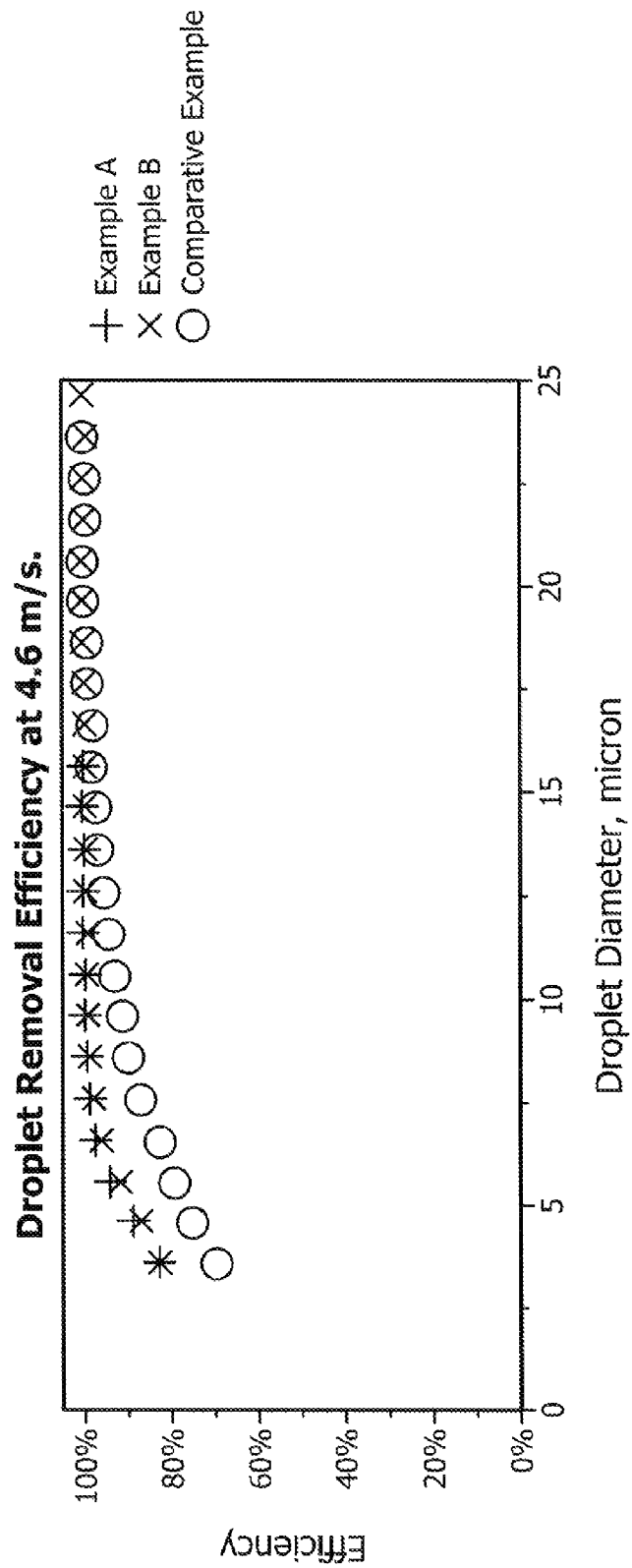

The droplet removal efficiencies of the mist eliminator examples are shown in FIGS. 15A and 15B. At 3 m/s. Example A and B droplet removal efficiencies are near 100% for 10 microns and larger drops. At 5 microns, the efficiencies decreased to 75% to 85%. Example B efficiency is slightly higher than Example A. Therefore, the zigzag airflow passage of Example B can further improve mist removal at this air velocity. At 4.6 m/s, the removal efficiencies of Examples A and B become identical.

Comparatively, the efficiency of the vane mist eliminator is only 80% for 10 microns drops, and 60% for 5 microns drops. The results show that droplet removal efficiencies of Example A and B are higher than the Comparative Example between 3 to 4.6 m/s, the most common gas velocity in wet scrubbers.

Figure 15C:
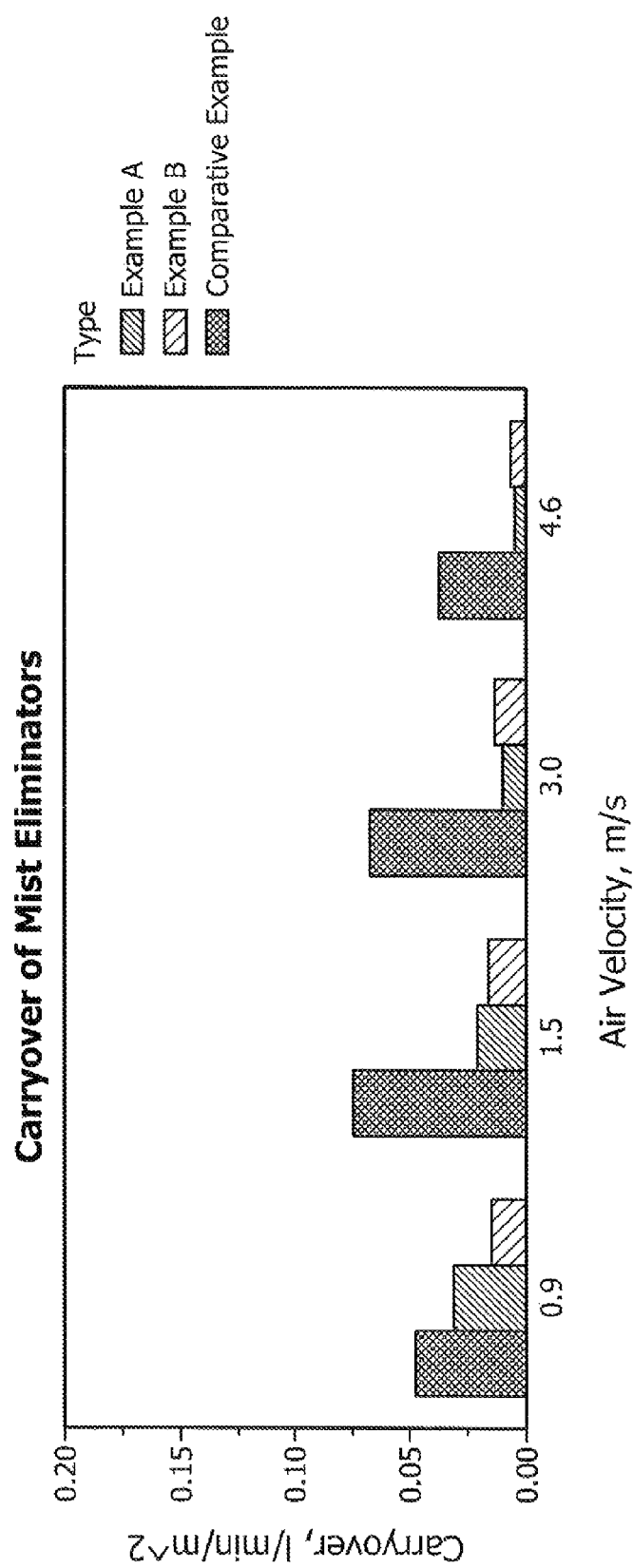

The results of carryover measurements are shown in FIG. 15C. As shown in the chart, the liquid carryover of Example A and B are both significantly lower than the Comparative Example. Carryover is the amount of liquid measured downstream of the mist eliminator. It is composed of drops that pass from upstream to downstream of the device, and any collected liquid that re-entrains into the gas stream. A mist eliminator must allow the collected liquid to drain and prevent it from re-entrainment.

In conclusion, the results demonstrate that the droplet removal efficiencies and carryover of Example A and B meet and exceed the performance of Comparative Example.

II—Example

A single layer SPC tape sample with a thickness of 20 mils (508 μm) had force to bend stiffness values between 255 and 320 mg. It was, found that the minimum force to bend stiffness required for an acceptable shape holding characteristic was at least 1000 mg.

Figure 16:
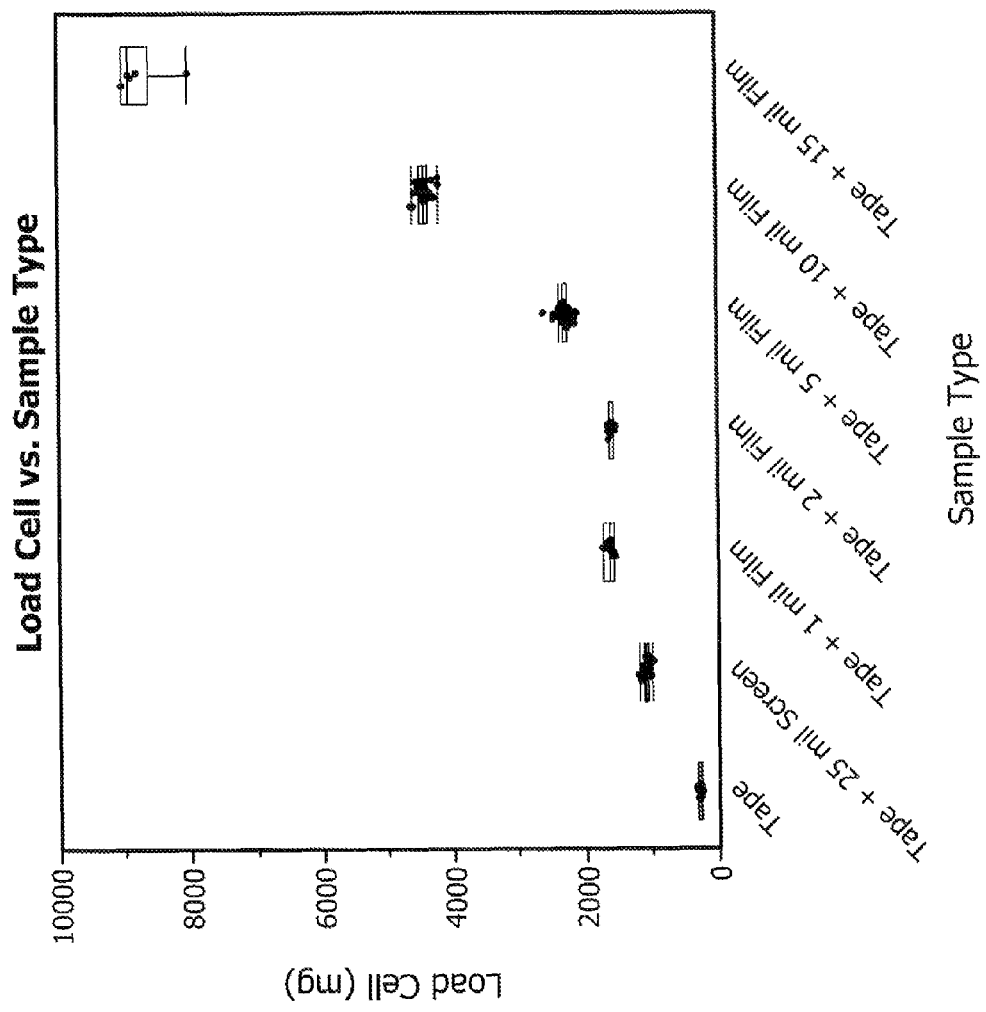
FIG. 16 illustrates a performance chart in a second example.

A series of shape holding samples were made with extruded, 25 mil (635 μm) PVDF screen and extruded PVDF films with a range of thicknesses from 1 mil (25 μm) to 15 mils (381 μm) laminated between two 20 mil (508 μm) SPC tapes. The force to bend stiffness measurements are shown in FIG. 16. A preferred PVDF layer was found to be a 1 mil (25 μm) extruded film made with Hylar® 9009 PVDF resin. The lamination step was accomplished using heated, chrome plated nip rolls with a gap setting of 21 mils (533 μm), a temperature of 180° C. and a speed of 1.5 meters per minute. A 33 mm wide PVDF film web was laminated between two 20 mil (508 μm) SPC layers that were also 33 cm wide. The resulting laminate sample was tested on the Gurley Stiffness Tester and found to have a force to bend stiffness values greater than 1500 mg.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain known modes of practicing the invention and to enable others skilled in the art to utilize the invention in such or other embodiments and with various modifications required by the particular application (s) or use(s) of the present invention. It is intended that the appended claims be construed to include alternative embodiments to the extent permitted by the prior art.

What is claimed is:

1. An integrated device for removal of both liquid-containing droplets and pollutants from a gas stream, comprising:
    a plurality of passageways each having an inlet and an outlet for the flow of the gas stream therethrough, wherein each passageway of said plurality of passageways includes at least one segment configured to perturb the flow of at least a portion of the gas stream between the inlet and the outlet thereof; and,
    a plurality of exposed of surface portions, different ones of which are disposed along different ones of said plurality of passageways, each of plurality of said exposed surface portions comprising a sorbent-polymer-composite (SPC) material adapted for adsorption of elemental and oxidized mercury vapor, wherein said integrated device is positionable in the gas stream so that liquid-containing droplets present in the gas stream contact and are thereby removed from the gas stream at said exposed surface portions, and mercury vapor molecules present in the gas stream are adsorbed by and affixed within the SPC material of said exposed surface portions.

2. The integrated device of claim 1, wherein said at least one segment of each of said plurality of passageways includes at least one passageway surface discontinuity.

3. The integrated device of claim 2, wherein said at least one passageway surface discontinuity of said at least one segment of a given one of said plurality of passageways comprises:
    an open space between different surface portions along said given one of said plurality of passageways.

4. The integrated device of claim 3, wherein said at least one passageway surface discontinuity of said at least one segment of a given one of said plurality of passageways comprises:
    a plurality of different surface portions disposed in non-aligned relative to one another along said given one of the plurality of passageways.

5. The integrated device of claim 1, further comprising:
    a plurality of modules defining said plurality of passageways and said plurality of exposed surface portions, at least two modules of the plurality of modules being positionable in adjacent relation in the gas stream for series gas stream flow therethrough, wherein each of said at least two modules define different parts of each of a first plurality of said plurality of passageways.

6. The integrated device of claim 5, wherein said at least two modules are positionable in adjacent relation in the gas stream so that said different parts of each of said first plurality of passageways have an open space therebetween.

7. The integrated device of claim 5, wherein said at least two modules are separately positionable in adjacent relation in the gas stream so that different surface portions corresponding with said different parts of each of said first plurality of passageways are disposed in non-aligned relation to one another.

8. The integrated device of claim 7, wherein said at least two modules are separately positionable in adjacent relation in the gas stream so that different surface portions corresponding with said different parts of each of said first plurality of passageways are disposed at an angle relative to one another.

9. The integrated device of claim 5, wherein each of said plurality of modules comprises alternating layers of pleated and flat sheets, each comprising said SPC material.

10. The integrated device of claim 9, wherein at least one of the following is disposed across at least a portion of said plurality of passageways between said different parts thereof;
    a woven mesh layer;
    a non-woven layer;
    a pleated mesh layer; and
    a gas-diversion member.

11. The integrated device of claim 9, wherein each of said pleated and flat sheets comprises:
    a middle layer, wherein each of said pleated and flat sheets has a bending resistance stiffness greater than 1000 mg as measured with a Gurley Stiffness Tester.

12. The integrated device of claim 11, wherein the middle layer comprises: polyvinylidene difluoride, laminated between outer tape layers comprising said SPC material.

13. The integrated device of claim 9, wherein each of said plurality of modules is formed by arranging said alternating layers of pleated and flat sheets within a corresponding one of a corresponding plurality of support frames.

14. The integrated device of claim 13, wherein the pleated and flat sheets are adapted to maintain their respective shapes within said plurality of support frames at temperatures of up to 80° C.

15. The integrated device of claim 13, wherein each of said plurality of support frames includes four side members and two opposing open faces.

16. The integrated device of claim 13, wherein said plurality of support frames comprises:
    a first portion having two opposing side members of a first parallelogram configuration; and,
    a second portion having two opposing side members of a second parallelogram configuration.

17. The integrated device of claim 1, wherein said SPC material comprises a sorbent material and a polymer material.

18. The integrated device of claim 17, wherein said polymer material comprises a fluoropolymer.

19. The integrated device of claim 18, wherein said fluoropolymer is selected from the group comprising polytetrafluoroethylene (PTFE); polyfluoroethylene propylene (PFEP); polyperfluoroacrylate (PPFA); polyvinylidene fluoride (PVDF); a terpolyrner of tetrafluoroethylene, hexafluoropropylene and vinylidene fluoride (THV); polychloro trifluoro ethylene (PCTFE), and other copolymers or terpolymers containing at least one fluoromonomer with or without additional non-fluorinated monomers.

20. The integrated device of claim 17, wherein the sorbent material has been treated with at least one chemical substance selected from the group comprising: alkaline metal iodides, organic iodide compounds, vanadium oxides, metal sulfates, elemental sulfur, sulfuric acid, oxides of iodine, chlorides of potassium, bromides of potassium, chlorides of sodium, bromides of sodium, chlorides of ammonium, bromides of ammonium, iodides of ammonium, zinc acetate and iodide coordination complexes.

21. The integrated device of claim 9, wherein at least a portion of one of said plurality of pleated sheets and said plurality of flat sheets comprises sheets having top edges angled for drainage of liquid-containing droplets formed thereupon.

22. A process for removing both liquid-containing droplets and pollutants from a gas stream, utilizing the integrated device of claim 1, comprising:
    positioning the integrated device of claim 1 for contact with a gas stream;
    contacting said gas stream with said exposed surface portions, wherein liquid-containing droplets present in the gas stream contact and are thereby removed from the gas stream at said plurality of exposed surface portions, and elemental and oxidized mercury vapor present in the gas stream are adsorbed by and affixed within the SPC material of the exposed surface portions; and,
    collecting said liquid-containing droplets and said sulfuric acid droplets together from said plurality of exposed surface portions.

23. The process of claim 22, said positioning step including:
    locating said integrated device in a wet scrubber.

24. The process of claim 23, said positioning step further including:
    removing a mist eliminator from a region within the wet scrubber; and,
    positioning said integrated device in at least a portion of said region within the wet scrubber.

25. The process of claim 23, wherein a scrub liquid used to contact and thereby scrub said gas stream in said wet scrubber is collected with said liquid-containing droplets and said sulfuric acid droplets within said wet scrubber.

26. A process as recited in claim 22, utilizing the integrated device of claim 5, said positioning step including:
    positioning said at least two modules in adjacent relation in the gas stream for series gas stream flow therethrough.

27. A process as recited in claim 25, said positioning step further including:
    locating a first one of said plurality of modules in the gas stream; and
    disposing a second one of said plurality of modules in stacked relation to the first one of the plurality of modules in the gas stream after said locating step.

28. A process as recited in claim 27, further comprising:
    separately removing one of the first one and second one of the plurality of modules from the gas stream; and
    positioning a third one of the plurality of modules in the gas stream in stacked relation to the non-removed one of the plurality of modules.

29. An integrated device for removal of both liquid-containing droplets and pollutants from a gas stream, comprising:
    a plurality of passageways each having an inlet and an outlet for the flow of the gas stream therethrough, wherein each passageway of said plurality of passageways includes at least one segment configured to perturb the flow of at least a portion of the gas stream between the inlet and the outlet thereof; and,
    a plurality of exposed of surface portions, different ones of which are disposed along different ones of said plurality of passageways, each of plurality of said exposed surface portions comprising a sorbent-polymer-composite (SPC) material adapted for adsorption of elemental and oxidized mercury vapor, wherein said integrated device is positionable in the gas stream so that liquid-containing droplets present in the gas stream contact and are thereby removed from the gas stream at said exposed surface portions, and mercury vapor molecules present in the gas stream are adsorbed by and affixed within the SPC material of said exposed surface portions,
    a plurality of modules defining said plurality of passageways and said plurality of exposed surface portions, at least two modules of the plurality of modules being positionable in adjacent relation in the gas stream for series gas stream flow therethrough, wherein each of said at least two modules define different parts of each of a first plurality of said plurality of passageways, wherein each of said plurality of modules comprises alternating layers of pleated and flat sheets, each comprising said SPC material.

30. An integrated device for removal of both liquid-containing droplets and pollutants from a gas stream, comprising:

a plurality of passageways each having an inlet and an outlet for the flow of the gas stream therethrough, wherein each passageway of said plurality of passageways includes at least one segment configured to perturb the flow of at least a portion of the gas stream between the inlet and the outlet thereof; and, a plurality of exposed of surface portions, different ones of which are disposed along different ones of said plurality of passageways, each of plurality of said exposed surface portions comprising a sorbent-polymer-composite (SPC) material adapted for adsorption of elemental and oxidized mercury vapor, wherein said integrated device is positionable in the gas stream so that liquid-containing droplets present in the gas stream contact and are thereby removed from the gas stream at said exposed surface portions, and mercury vapor molecules present in the gas stream are adsorbed by and affixed within the SPC material of said exposed surface portions, a plurality of modules defining said plurality of passageways and said plurality of exposed surface portions, at least two modules of the plurality of modules being positionable in adjacent relation in the gas stream for series gas stream flow therethrough, wherein each of said at least two modules define different parts of each of a first plurality of said plurality of passageways, wherein each of said plurality of modules comprises alternating layers of pleated and flat sheets, each comprising said SPC material, wherein each of said pleated and flat sheets comprises:
a middle layer, wherein each of said pleated and flat sheets has a bending resistance stiffness greater than 1000 mg as measured with a Gurley Stiffness Tester, wherein the middle layer comprises: polyvinylidene difluoride, laminated between outer tape layers comprising said SPC material.

* * * * *